(12) United States Patent
Onda et al.

(10) Patent No.: US 10,541,622 B2
(45) Date of Patent: Jan. 21, 2020

(54) ELECTRIC MOTOR DRIVE DEVICE

(71) Applicant: Mitsubishi Electric Corporation, Chiyoda-ku (JP)

(72) Inventors: Kohei Onda, Chiyoda-ku (JP); Yoshihiro Takeshima, Chiyoda-ku (JP); Hiroyasu Iwabuki, Chiyoda-ku (JP); Masahiro Iezawa, Chiyoda-ku (JP); Ryo Shinohara, Chiyoda-ku (JP); Hideki Sugita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/098,209

(22) PCT Filed: Mar. 8, 2017

(86) PCT No.: PCT/JP2017/009162
§ 371 (c)(1),
(2) Date: Nov. 1, 2018

(87) PCT Pub. No.: WO2017/217036
PCT Pub. Date: Dec. 21, 2017

(65) Prior Publication Data
US 2019/0149063 A1    May 16, 2019

(30) Foreign Application Priority Data

Jun. 15, 2016  (JP) ................................. 2016-118434
Jun. 15, 2016  (JP) ................................. 2016-118435

(51) Int. Cl.
*H02P 27/08*  (2006.01)
*H02M 7/48*  (2007.01)
(Continued)

(52) U.S. Cl.
CPC ............... *H02M 7/48* (2013.01); *B60L 3/003* (2013.01); *H02M 1/32* (2013.01); *H02P 27/06* (2013.01); *H02M 7/5387* (2013.01)

(58) Field of Classification Search
CPC combination set(s) only.
See application file for complete search history.

(56) References Cited

U.S. PATENT DOCUMENTS

2004/0160792 A1* 8/2004 Youm ..................... H02M 1/32
                                                        363/37
2008/0291589 A1* 11/2008 Yokai ..................... H02P 6/182
                                                        361/33
(Continued)

FOREIGN PATENT DOCUMENTS

JP           9-47055 A      2/1997
JP      2001-352664 A     12/2001
(Continued)

OTHER PUBLICATIONS

Extended European Search Report dated Jul. 1, 2019 in European Patent Application No. 17812942.5, 8 pages.
International Search Report dated May 9, 2017 in PCT/JP2017/009162 filed Mar. 8, 2017.

*Primary Examiner* — Bentsu Ro
(74) *Attorney, Agent, or Firm* — Oblon, McClelland, Maier & Neustadt, L.L.P.

(57) ABSTRACT

An electric motor drive device includes a smoothing capacitor and an inverter, and further includes an overvoltage protection unit for overvoltage protection for the smoothing capacitor, and a phase short-circuit control unit. The overvoltage protection unit includes: a discharge circuit having a discharge resistor and an IGBT connected in series; and a first determination circuit which determines, with determination delay, that smoothing capacitor voltage exceeds first set voltage, and turns on the IGBT. The phase short-circuit control unit is provided in a control device for drive- (Continued)

controlling the inverter and includes a second determination circuit which determines, with a determination period longer than the determination delay of the first determination circuit, that smoothing capacitor voltage exceeds second set voltage lower than the first set voltage, to perform phase short-circuit control for the inverter.

20 Claims, 23 Drawing Sheets

(51) Int. Cl.
*B60L 3/00* (2019.01)
*H02M 1/32* (2007.01)
*H02P 27/06* (2006.01)
*H02M 7/5387* (2007.01)

(56) References Cited

U.S. PATENT DOCUMENTS

| 2012/0194110 A1* | 8/2012 | Konig | H02P 6/16 318/400.17 |
| 2013/0200731 A1 | 8/2013 | Werner et al. | |
| 2015/0016159 A1* | 1/2015 | Deboy | H02J 3/383 363/71 |

FOREIGN PATENT DOCUMENTS

| JP | 2004-222395 A | 8/2004 |
| JP | 2012-115143 A | 6/2012 |
| JP | 2012-196143 A | 10/2012 |

* cited by examiner

— 1 —

ELECTRIC MOTOR DRIVE DEVICE

TECHNICAL FIELD

The present invention relates to an electric motor drive device for driving an electric raptor capable of regenerative operation using ail inverter.

BACKGROUND ART

In general, an electric motor drive device for driving an electric motor by an inverter has a smooching capacitor provided in parallel with a DC power supply on the inverter input side. The smoothing capacitor serves to reduce the impedance of a main circuit and suppress surge voltage, and also serves to absorb regenerative power in the case of abnormality and prevent overvoltage in the main circuit. One example of abnormal cases is a so-called load dump in which, while the electric motor is performing regenerative operation, input wiring of the inverter is disconnected due to vibration or the like, or a breaker provided on the input side fails, and thus connection between a smoothing capacitor on the inverter input side and a DC power supply is opened.

If the capacitance of the smoothing capacitor is reduced for the purpose of size reduction, increase in voltage caused by absorption of regenerative power in the case of abnormality becomes great, leading to overvoltage.

As a conventional technique for suppressing such overvoltage, an overvoltage protection device is provided which includes: a bypass resistance circuit interposed between terminals at an input part of an inverter; a relay interposed in series to the bypass resistance circuit and controlled, to be opened/closed; and control means for controlling the relay to make the bypass resistance circuit active when input voltage of the inverter is equal to or greater than reference voltage (see, for example, Patent Document 1).

A conventional electric motor drive device using another technique includes: a regenerative power processing circuit connected in parallel to a smoothing capacitor between a positive side and a negative side of a DC power supply; a braking power processing circuit connected to an AC power supply line extending from an inverter bridge to an electric motor; and a common resistor which also serves as a braking resistor included in the regenerative power processing circuit and used for processing regenerative power from the electric motor (see, for example, Patent Document 2).

In a conventional electric motor drive device using still another technique, when abnormality has occurred in which a DC circuit leading to an inverter from a battery as a power supply is opened, for example, switching elements of an upper arm or a lower arm of the inverter are collectively turned on to output a zero-voltage vector, thereby short-circuiting input terminals of an electric motor and stopping supply of power from the inverter (see, for example, Patent Document 3).

CITATION LIST

Patent Document

Patent Document 1: Japanese Laid-Open Patent Publication No. 2001-352664
Patent Document 2: Japanese Laid-Open Patent Publication No. 2012-196143
Patent Document 3: Japanese Laid-Open Patent Publication No. 9-47055

SUMMARY OF THE INVENTION

Problems to be Solved by the Invention

In the overvoltage protection device described in Patent Document 1, in the case of abnormality, regenerative power is discharged through the bypass resistance circuit, whereby increase in voltage of the smoothing capacitor is suppressed. However, if the regenerative power is great, the rated power capacity of the bypass resistance circuit increases, and thus the size of the overvoltage protection device increases.

In the electric motor drive device described in Patent Document 2, since a resistor for discharging regenerative power in the case of abnormality is used also as a braking resistor, size reduction is promoted. However, this electric motor drive device is not applicable to the case of not having a braking resistor as in an electric motor drive device for automobile, for example.

In the electric motor drive device described in Patent Document 3, in the case of abnormality, the electric motor is brought into a phase short-circuited state so that flow of regenerative power into the smoothing capacitor is stopped. In this case, on the basis of information about various detectors provided to a main circuit and the electric motor, a control circuit for drive-controlling the inverter with a control cycle performs determination as to voltage increase in the smoothing capacitor and performs phase short-circuit control for the inverter. In order to perform determination as to voltage increase in the smoothing capacitor without being influenced by noise, a determination period over plural times of control cycles is required, and regenerative power during this period needs to be absorbed by the smoothing capacitor. Therefore, there is a limit in reducing the capacitance of the smoothing capacitor so as to reduce the size.

The present invention has been made to solve the above problems, and an object of the present invention is to provide an electric motor drive device that is capable of, in the case of abnormality in which connection between a smoothing capacitor on the inverter input side and a DC power supply is opened, reliably suppressing voltage increase in the smoothing capacitor, and that can promote size reduction of the smoothing capacitor.

Solution to the Problems

An electric motor drive device according to the present invention includes: a smoothing capacitor connected in parallel to a DC power supply; an inverter which has a plurality of semiconductor switching elements and converts DC power from the smoothing capacitor to multi-phase AC power, to drive an electric motor; a control device for drive-controlling the plurality of semiconductor switching elements with a predetermined control cycle, to control power-running operation and regenerative operation of the inverter; and an overvoltage protection unit having: a discharge circuit which has a discharge resistor and a semiconductor switching element connected in series and which is connected between both terminals of the smoothing capacitor; and a first determination circuit for determining that voltage of the smoothing capacitor exceeds first set voltage, the overvoltage protection unit being configured to turn on the semiconductor switching element in the discharge circuit on the basis of the determination by the first determination circuit. The control device includes a phase short-circuit control unit having a second determination circuit for determining that voltage of the smoothing capacitor exceeds second set voltage lower than the first set voltage, the phase short-circuit control unit being configured to bring the electric motor into a phase short-circuited state on the basis of the determination by the second determination circuit, and a determination period required for the second determination circuit to perform the determination is longer than a period required for the first determination circuit to perform the determination.

Effect of the Invention

With the electric motor drive device according to the present invention, in the case of abnormality in which connection between the smoothing capacitor on the inverter input side and the DC power supply is opened, voltage increase in the smoothing capacitor due to regenerative power can be reliably suppressed, and the smoothing capacitor can be downsized, whereby size reduction and simplification of the entire device configuration can be achieved.

DESCRIPTION OF EMBODIMENTS

Embodiment 1

Hereinafter, embodiment 1 of the present invention will be described.

Figure 1:
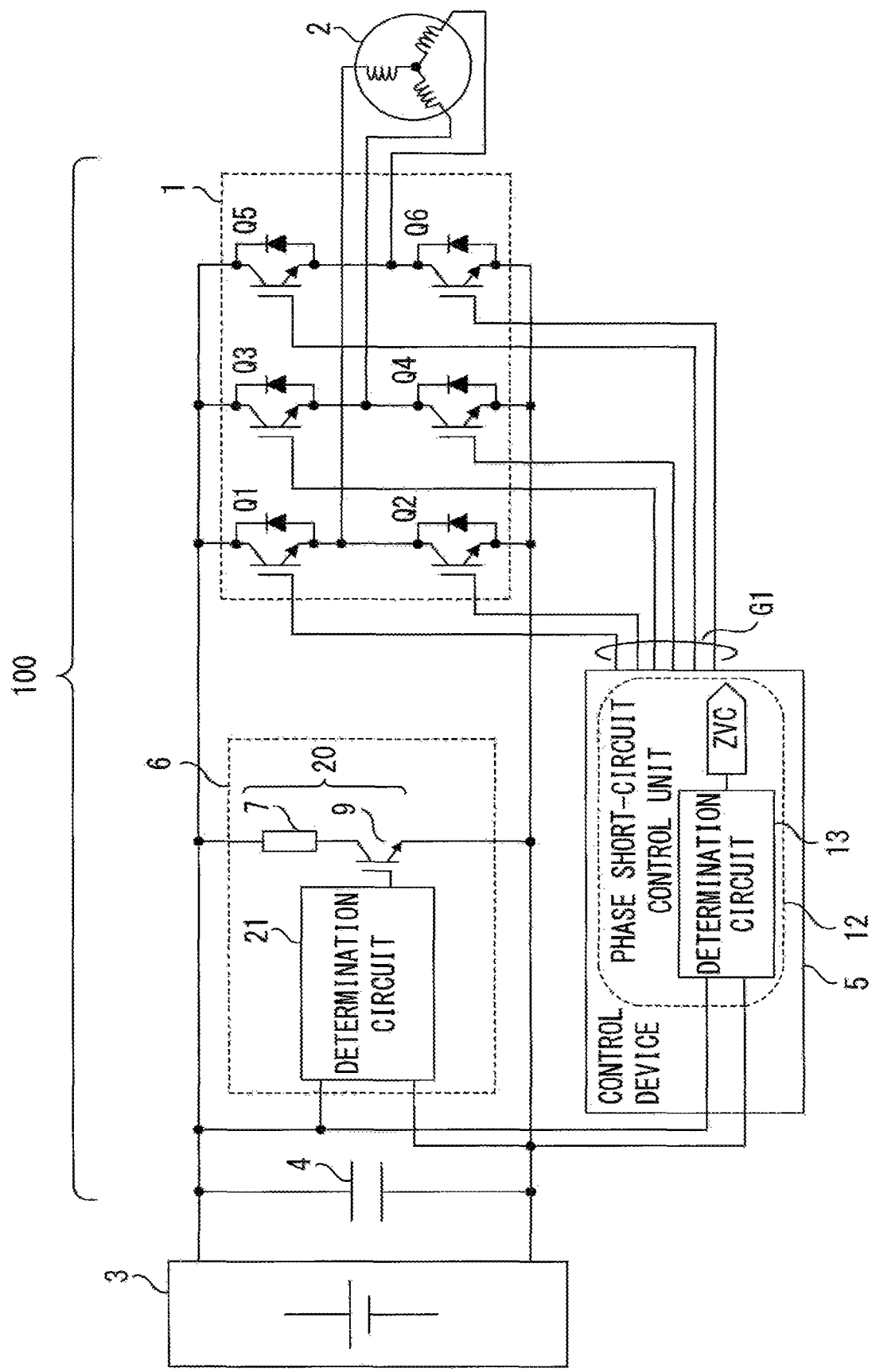
FIG. 1 is a diagram showing the schematic configuration of an electric motor drive device according to embodiment 1 of the present invention.

FIG. 1 is a diagram showing the schematic configuration of ah electric motor drive device according to embodiment 1 of the present invention.

As shown in FIG. 1, the electric motor drive device 100 is configured to convert DC power from a DC power supply 3 to AC power by an inverter 1 and drive an electric motor 2, and includes: the inverter 1; a smoothing capacitor 4 connected in parallel to the DC power supply 3; a control device 5 for controlling the inverter 1; and an overvoltage protection unit 6. It is noted, that the electric motor 2 is capable of both drive operation and regenerative operation.

The inverter 1 is configured to be a three-phase bridge circuit having insulated gate bipolar transistors (IGBT) Q1 to Q6 as semiconductor switching elements to which diodes are respectively connected in antiparallel, and converts DC power of the smoothing capacitor 4 to three-phase AC power, thereby driving the electric motor 2. It is noted that the semiconductor switching elements Q1 to Q6 composing the inverter 1 are not limited to IGBTs, but may be other self-turn-off semiconductor switching elements such as MOSFETs.

The control device 5 includes a computing processing unit such as CPU (not shown), and performs a computing process with a predetermined control cycle, to generate gate signals G1 for controlling switching of the IGBTs Q1 to Q6 in the inverter 1, thereby controlling, power-running operation and regenerative operation of the inverter 1. The control device 5 further includes a phase short-circuit control unit 12 described later.

The overvoltage protection unit 6 includes: a discharge circuit 20 in which a discharge resistor 7 and an IGBT 9 as a semiconductor switching element are connected in series; and a first determination circuit 21 for performing determination as to voltage of the smoothing capacitor 4 which is input voltage of the inverter 1. The discharge circuit 20 is connected between both terminals of the smoothing capacitor 4, and the conduction state of the IGBT 9 is controlled on the basis of an output signal from the first determination circuit 21. It is noted that the semiconductor switching element used in the discharge circuit 20 is not limited to the IGBT 9 but may be another self-turn-off semiconductor switching element.

In the case of abnormality such as load dump, the first determination circuit 21 determines that smoothing capacitor voltage Vfc which is voltage of the smoothing capacitor 4 exceeds first set voltage Vfcm, and then if the smoothing capacitor voltage Vfc exceeds the first set voltage Vfcm, the first determination circuit 21 outputs a signal (hereinafter, ON signal) for turning on the IGBT 9. The overvoltage protection unit 6 causes current to flow through the discharge resistor 7 by turning on the IGBT 9, thereby absorbing regenerative power from the electric motor 2 and preventing overvoltage in a main circuit of the electric motor drive device 100.

The phase short-circuit control unit 12 includes a second determination circuit 13 for determining that the smoothing capacitor voltage Vfc exceeds second set voltage Vfcz in the case of abnormality such as load dump. If the smoothing capacitor voltage Vfc exceeds the second set voltage Vfcz, the second determination circuit 13 generates a phase short-circuit command ZVC which is a determination signal, and the control device 5 controls the inverter 1 so as to bring the electric motor 2 into a phase short-circuited state. The second set voltage Vfcz is equal to or smaller than the first set voltage Vfcm used by the first determination circuit 21 in the overvoltage protection unit 6.

Here, the phase short-circuited state means that, for example, the semiconductor switching elements Q1, Q3, Q5 or the semiconductor switching elements Q2, Q4, Q6 are turned on so that current flows back into the electric motor 2.

In the above description, the case where the first set voltage used by the first determination circuit 21 in the overvoltage protection unit 6 is a single voltage value, has been shown. However, in general, first set voltages (Vfch, Vfcl (<Vfch)) having a hysteresis width (Vfch-Vfcl) are used in order to prevent oscillation of the first determination circuit 21. Hereinafter, two first set voltages (Vfch, Vfcl) are simply referred to as voltage Vfch and voltage Vfcl. That is, when the smoothing capacitor voltage Vfc exceeds the voltage Vfch, the first determination circuit 21 outputs an ON signal to turn on the IGBT 9, and thereafter, when the smoothing capacitor voltage Vfc has become equal to or smaller than the voltage Vfcl, the first determination circuit 21 stops output of the ON signal, to turn off the IGBT 9. In this case, the second set voltage Vfcz used by the second determination circuit 13 in the phase short-circuit control unit 12 is equal to or smaller than the voltage Vfcl.

Figure 2:
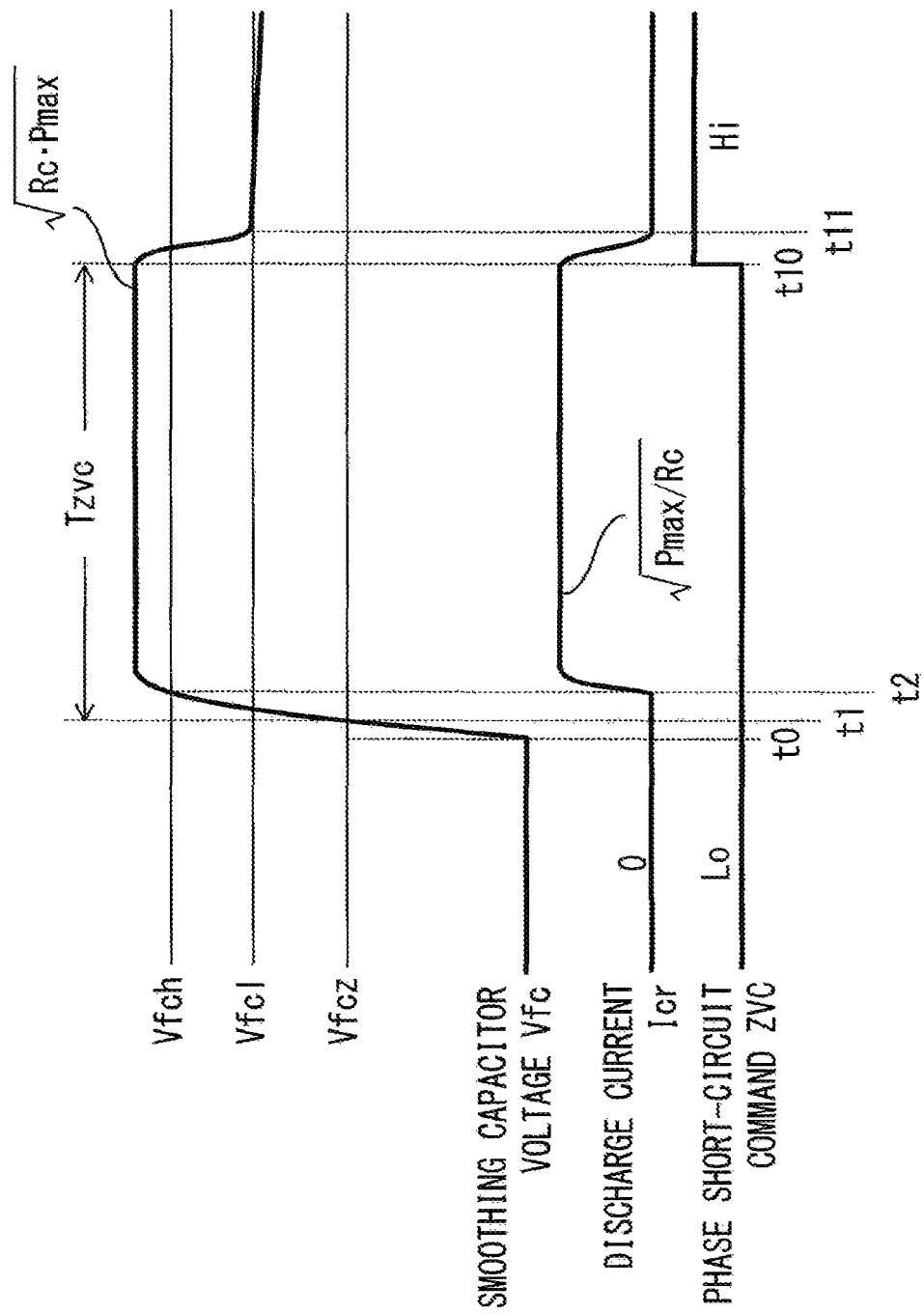
FIG. 2 is a waveform diagram illustrating protection operation of the electric motor drive device according to embodiment 1 of the present invention.

FIG. 2 is a diagram illustrating protection operation of the electric motor drive device 100, and shows waveforms of the smoothing capacitor voltage Vfc, discharge current Icr flowing through the discharge resistor 7, and the phase short-circuit command ZVC generated by the phase short-circuit control unit 12. Hereinafter, during regenerative operation of the electric motor 2, protection operation for protecting the main circuit of the electric motor drive device 100 from overvoltage when a load dump has occurred which is abnormality in which connection between the smoothing capacitor 4 and the DC power supply 3 is opened, will be described with reference to FIG. 2. In this case, it is assumed that the electric motor 2 performs regenerative operation at maximum regenerative power Pmax.

At time t0, a load dump occurs in a state in which the maximum regenerative power Pmax is generated. At this time, power is injected into the smoothing capacitor 4 from the electric motor 2 via the inverter 1, whereby the smoothing capacitor voltage Vfc increases.

At time t1, when the smoothing capacitor voltage Vfc exceeds the second set voltage Vfcz, the second determination circuit 13 in the phase short-circuit control unit 12 starts determination operation for generating the phase short-circuit command ZVC. It is noted that, if a state in which the smoothing capacitor voltage Vfc exceeds the second set voltage Vfcz has continued during a determination period Tzvc, the second determination circuit 13 outputs the phase short-circuit command ZVC.

At time t2, when the smoothing capacitor voltage Vfc exceeds the voltage Vfch, the first determination circuit 21 in the overvoltage protection unit 6 outputs an ON signal to turn on the IGBT 9, so that current flows through the discharge resistor 7.

As a result, the smoothing, capacitor voltage Vfc is clamped at voltage $\sqrt{(Rc \cdot Pmax)}$ at which the maximum regenerative power Pmax and discharge power which is power consumed by the discharge resistor 7 having a resistance value Rc are balanced. At this time, the discharge current Icr is $\sqrt{(Pmax/Rc)}$.

The resistance value Rc of the discharge resistor 7 is set so that the clamp voltage (Rc·Pmax) for the smoothing capacitor voltage Vfc becomes equal to or smaller than the withstand voltage of the main circuit. In actuality, a determination delay Tov of the first determination circuit 21, an operation delay of the IGBT 9, and the like occur. Therefore, in consideration of voltage overshoot due to the above phenomena, the resistance value Rc of the discharge resistor 7 is set. The determination delay Tov of the first determination circuit 21 is a time period required for outputting an ON signal when the smoothing capacitor voltage Vfc exceeds the voltage Vfch, i.e., a time period required for voltage determination. The determination delay Tov is sufficiently shorter than the determination period Tzvc for the second determination circuit 13, and therefore is not shown in the drawing.

At time t10, which is a timing when a state in which the smoothing capacitor voltage Vfc exceeds the second set voltage Vfcz has continued during the determination period Tzvc, the second determination circuit 13 generates the phase short-circuit command ZVC (Hi signal). Then, the control device 5 controls the inverter 1 so as to bring the electric motor 2 into a phase short-circuited state. Thus, current flows back into the electric motor 2 and regenerative power is consumed in the electric motor 2, while flow of power into the smoothing capacitor 4 is stopped. After time t10, the smoothing capacitor voltage Vfc decreases by discharging through the discharge resistor 7, and the discharge current Icr also decreases.

At time t11, when the smoothing capacitor voltage Vfc becomes equal to or smaller than the voltage Vfcl, the first determination circuit 21 stops output of the ON signal, to turn off the IGBT 9. Thus, discharge operation by the overvoltage protection unit 6 is stopped and the discharge current Icr becomes 0.

Figure 3:
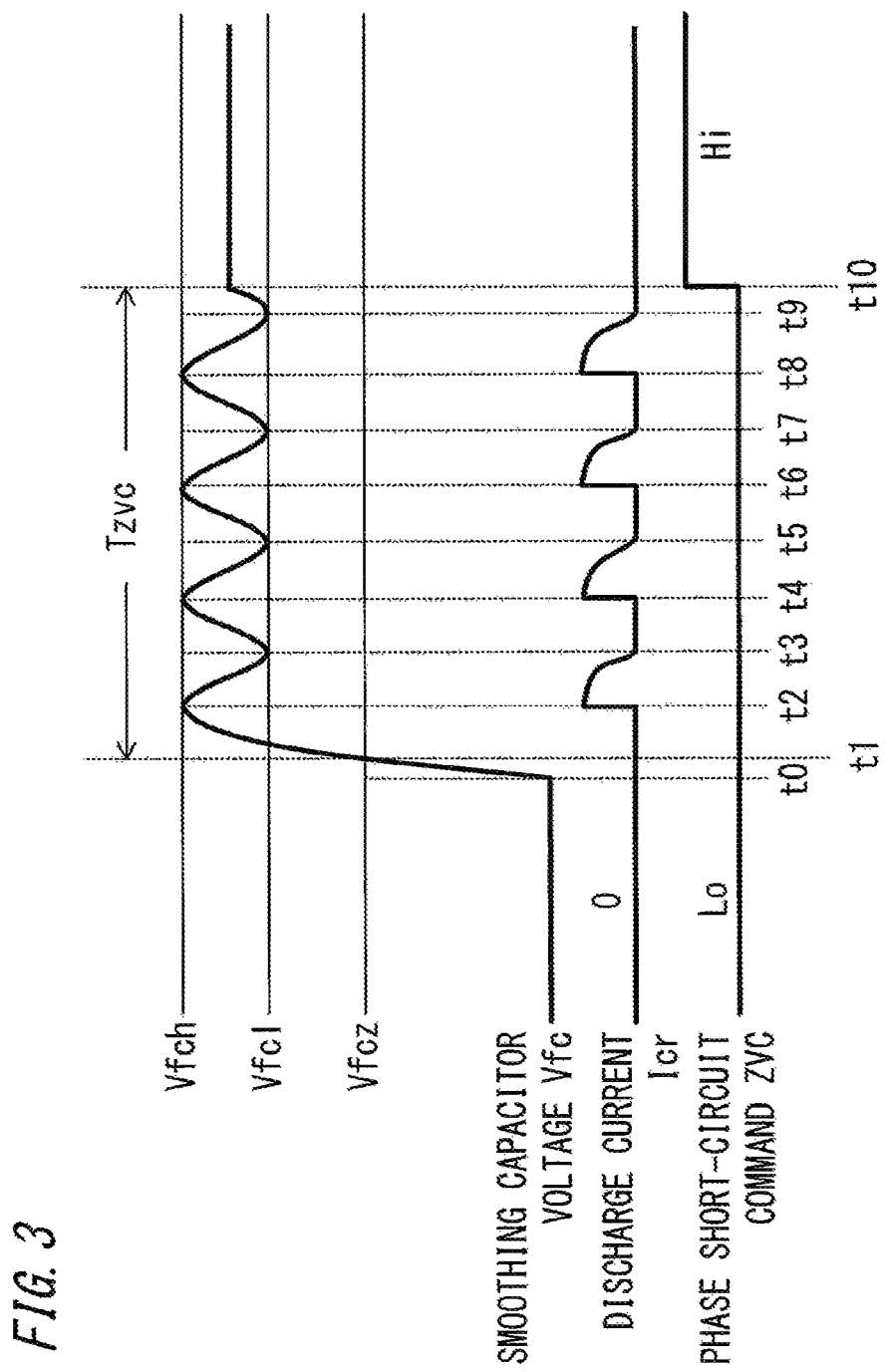
FIG. 3 is a waveform diagram illustrating another example of protection operation of the electric motor drive device according to embodiment 1 of the present invention.

Next, protection operation in the case where the electric motor 2 performs regenerative operation at approximately ½ of the maximum regenerative power Pmax in the same electric motor drive device 100 will be described with reference to FIG. 3.

At time t0, a load dump occurs in a state in which regenerative power Pmax/2 is generated. At this time, power is injected into the smoothing capacitor 4 from the electric motor 2 via the inverter 1, whereby the smoothing capacitor voltage Vfc increases.

At time t1, when the smoothing capacitor voltage Vfc exceeds the second set voltage Vfcz, the second determination circuit 13 in the phase short-circuit control unit 12 starts determination operation for generating the phase short-circuit command ZVC.

At time t2, when the smoothing capacitor voltage Vfc exceeds the voltage Vfch, the first determination circuit 21 in the overvoltage protection unit 6 outputs an ON signal to turn on the IGBT 9, so that current flows through the discharge resistor 7.

As described above, the resistance value Rc of the discharge resistor 7 is set such that the clamp voltage $\sqrt{(Rc \cdot Pmax)}$ at the time of maximum regeneration is equal to or smaller than the withstand voltage of the main circuit. In the case where the regenerative power is smaller than the maximum regenerative power, discharge power exceeds the regenerative power. Therefore, as discharge operation starts, the smoothing capacitor voltage Vfc decreases and the discharge current Icr also decreases.

At time t3, when the smoothing capacitor voltage Vfc becomes equal to or smaller than the voltage Vfcl, the first determination circuit 21 stops output of the ON signal, to turn off the IGBT 9. Thus, discharge operation by the overvoltage protection unit 6 is stopped and the discharge current Icr becomes 0. Then, in the smoothing capacitor 4, the smoothing capacitor voltage Vfc turns to increase as the discharge operation stops.

The same operations as those at times t2, t3 are repeated at times t4, t5, times t6, t7, and times t8, t9, and thus the discharge operation by the overvoltage protection unit 6 is intermittently repeated, whereby the smoothing capacitor voltage Vfc is kept between the voltage Vfch and the voltage Vfcl.

At time t10, which is a timing when a state in which the smoothing capacitor voltage Vfc exceeds the second set voltage Vfcz has continued during the determination period Tzvc, the second determination circuit 13 generates a phase short-circuit command ZVC (Hi signal). Then, the control device 5 controls the inverter 1 so as to bring the electric motor 2 into a phase short-circuited state. Thus, current flows back into the electric motor 2 and regenerative power is consumed in the electric motor 2 while flow of power into the smoothing capacitor 4 is stopped. In this case, the IGBT 9 is in an OFF state, and therefore the smoothing capacitor 4 does not perform charge/discharge operation after time t10.

As described above, in the case where the regenerative power is smaller than the maximum regenerative power Pmax, the overvoltage protection unit 6 intermittently repeats discharge operation, whereby the smoothing capacitor voltage Vfc is kept between the voltage Vfch and the voltage Vfcl. As shown in FIG. 3, in the case where the first determination circuit 21 has a hysteresis width, the number of times of switching of the IGBT 9 can be decreased. Then, switching loss is reduced and thus it becomes possible to apply a small-size component. It is noted that the number of times of switching of the IGBT 9 is maximized when the regenerative power is approximately Pmax/2.

Figure 4:
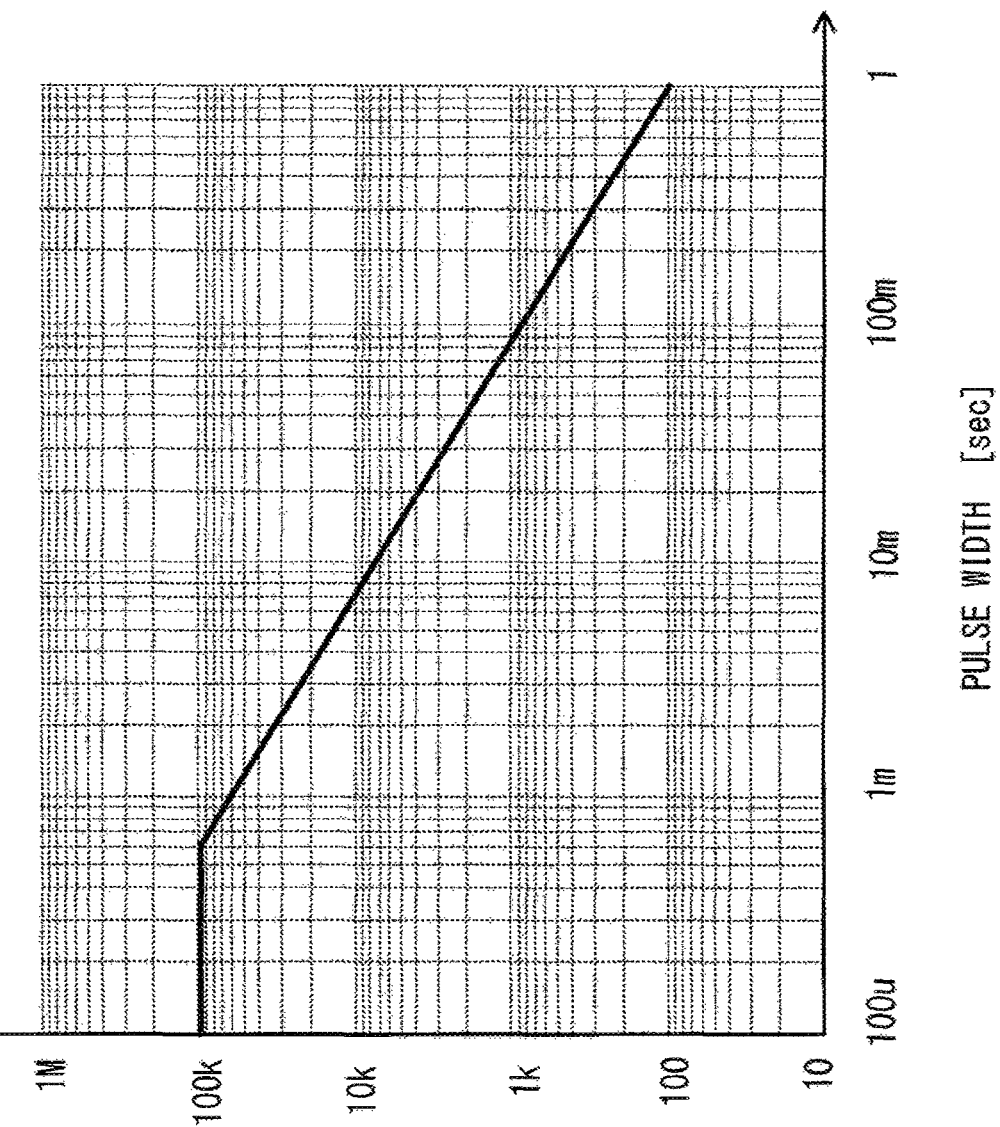
FIG. 4 shows a characteristics example of permissible power with respect to a pulse width in a discharge resistor according to embodiment 1 of the present invention.

FIG. 4 shows a characteristics example of permissible power with respect to a pulse width in the discharge resistor 7. Permissible pulse power is schematically shown using, as an example, the discharge resistor 7 formed from a ceramic resistor having a rated power of several-ten W class.

As shown in FIG. 4, for example, injected power (permissible power) permissible in the discharge resistor 7 with respect to a pulse having a width of 1 ms is about 60 kW. That is, injected electric energy permissible in the discharge resistor 7 with respect to a pulse having a width of 1 ms is 60 kW×1 ms=60 J.

If the injected power permissible in the discharge resistor 7 is represented by a function P(tw) of a time width tw of a power pulse to be applied, injected power permissible in the discharge resistor 7 with respect to a pulse having a time width equivalent to the determination period Tzvc of the second determination circuit 13 is P(Tzvc).

The determination period Tzvc of the second determination circuit 13 is set so as to satisfy the following expression (1).

$$P\max \leq P(Tzvc) \tag{1}$$

That is, the determination period Tzvc of the second determination circuit 13 is set such that the maximum regenerative power Pmax generated by the electric motor 2 does not exceed permissible power P(Tzvc) of the discharge resistor 7 with respect to the time width equivalent to the determination period Tzvc. For example, if the maximum regenerative power Pmax is 60 kW, from FIG. 4, the determination period Tzvc is set so as not to exceed 1 ms.

Instead of the permissible injected power P(tw) as shown in FIG. 4, a permissible electric energy W may be provided as the characteristics of the discharge resistor 7 by a manufacturer. In this case, the determination period Tzvc of the second determination circuit 13 may be set so as to satisfy the following expression (2).

$$P\max \cdot Tzvc \leq W \tag{2}$$

That is, the determination period Tzvc of the second determination circuit 13 is set, such that an electric energy (Pmax·Tzvc) occurring when the maximum regenerative power Pmax has continued during the determination period Tzvc does not exceed the permissible electric energy W of the discharge resistor 7.

As shown in FIG. 2, in the case where the electric motor drive device 100 performs regenerative operation at the maximum regenerative power Pmax, the maximum regenerative power Pmax is regenerated also during the determination period Tzvc of the second determination circuit 13, and during a major part of that period, i.e., between time t2 and time t10, the power is injected into the discharge resistor 7. By setting the determination period Tzvc of the second determination circuit 13 so as to satisfy the above expression (1) or expression (2), the discharge resistor 7 can be prevented from being overloaded. In addition, the determination period Tzvc can be set appropriately in accordance with the characteristics of the discharge resistor 7, and the components of the discharge resistor 7 can be downsized.

Figure 5:
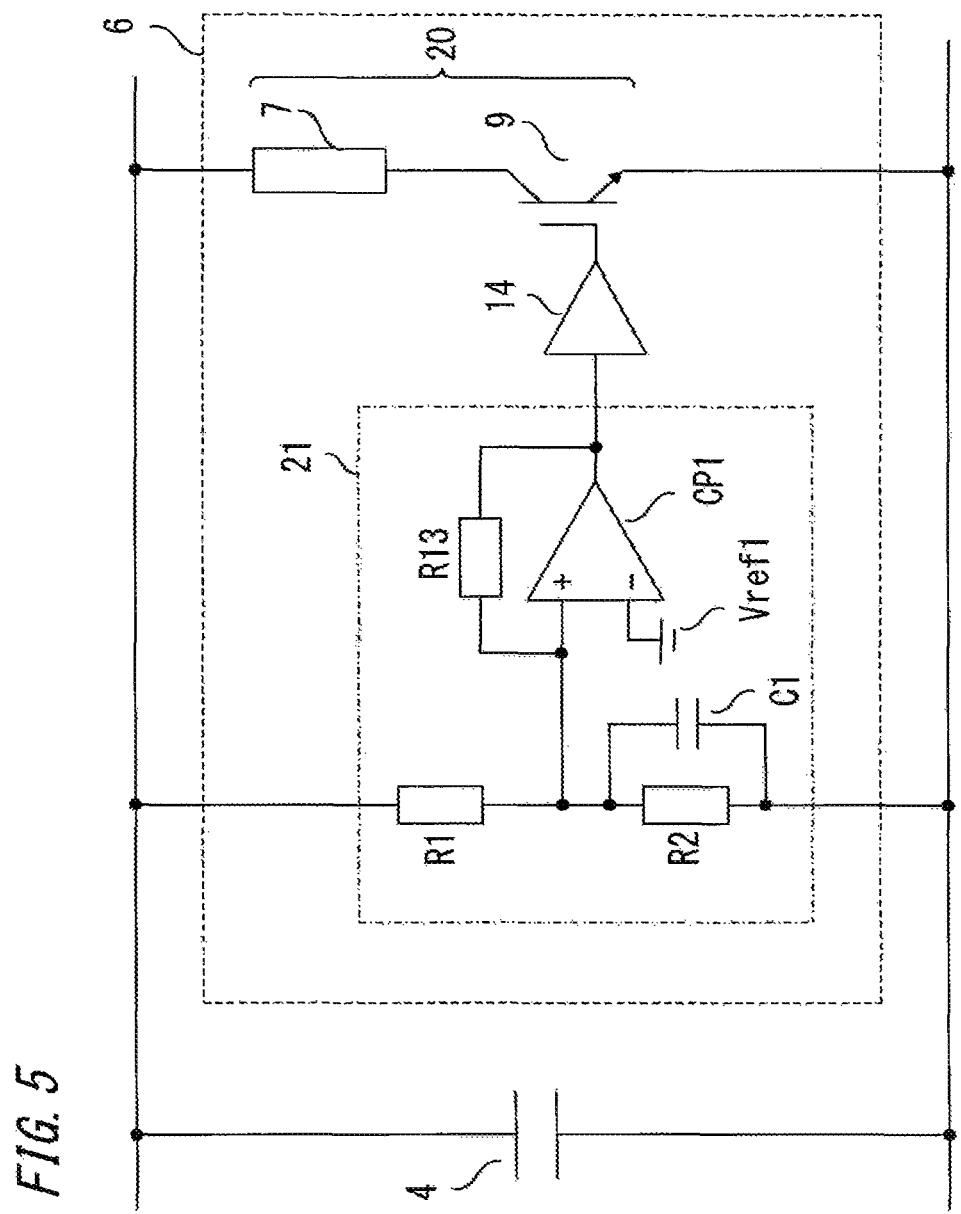
FIG. 5 is a diagram showing a first configuration example of an overvoltage protection unit according to embodiment 1 of the present invention.

FIG. 5 is a diagram showing a first configuration example of the overvoltage protection unit 6.

As described above, the overvoltage protection unit 6 is composed of: a first determination circuit 21 for performing determination as to the smoothing capacitor voltage Vfc which is input voltage of the inverter 1; the IGBT 9 the conduction state of which is controlled on the basis of an output signal from the first determination circuit 21; and the discharge resistor 7 connected in parallel to the IGBT 9. The discharge circuit 20 which is a series circuit of the discharge resistor 7 and the IGBT 9 is connected between both terminals of the smoothing capacitor 4.

The first determination circuit 21 includes resistors R1, R2 for dividing the smoothing capacitor voltage Vfc, a capacitor C1, a comparator CP1, and a resistor R13. In addition, a gate drive circuit 14 is provided on the output side of the first determination circuit 21.

In the first determination circuit 21, the smoothing capacitor voltage Vfc is divided by the resistor R1 and the resistor R2, and the comparator CP1 performs determination as to the divided voltage. The capacitor C1 is provided for the purpose of forming a low-pass filter together with the resistor R1. The comparator CP1 with the resistor R13 connected between the positive input terminal and the output terminal thereof operates as a hysteresis comparator. Reference voltage Vref1 for the comparator CP1 is generated by a stable power supply or a Zener diode, or using a shunt regulator or the like, whereby accuracy of determination voltage can be enhanced.

It is noted that the resistors R1, R2 and the reference voltage Vref1 are set such that the voltage divided by the resistors R1, R2 exceeds the reference voltage Vref1 when the smoothing capacitor voltage Vfc exceeds the first set voltage.

In the first configuration example, two resistors R1, R2 are used as voltage division resistors, but the present invention is not limited thereto. A low-pass filter is formed by the capacitor C1 and the resistor R1, but a general filter circuit may be provided.

A method for providing hysteresis for the determination in the comparator CP1 is not limited to using the resistor R13.

The gate drive circuit 14 may be provided as necessary in the case where the drive force of the comparator CP1 is insufficient.

Figure 6:
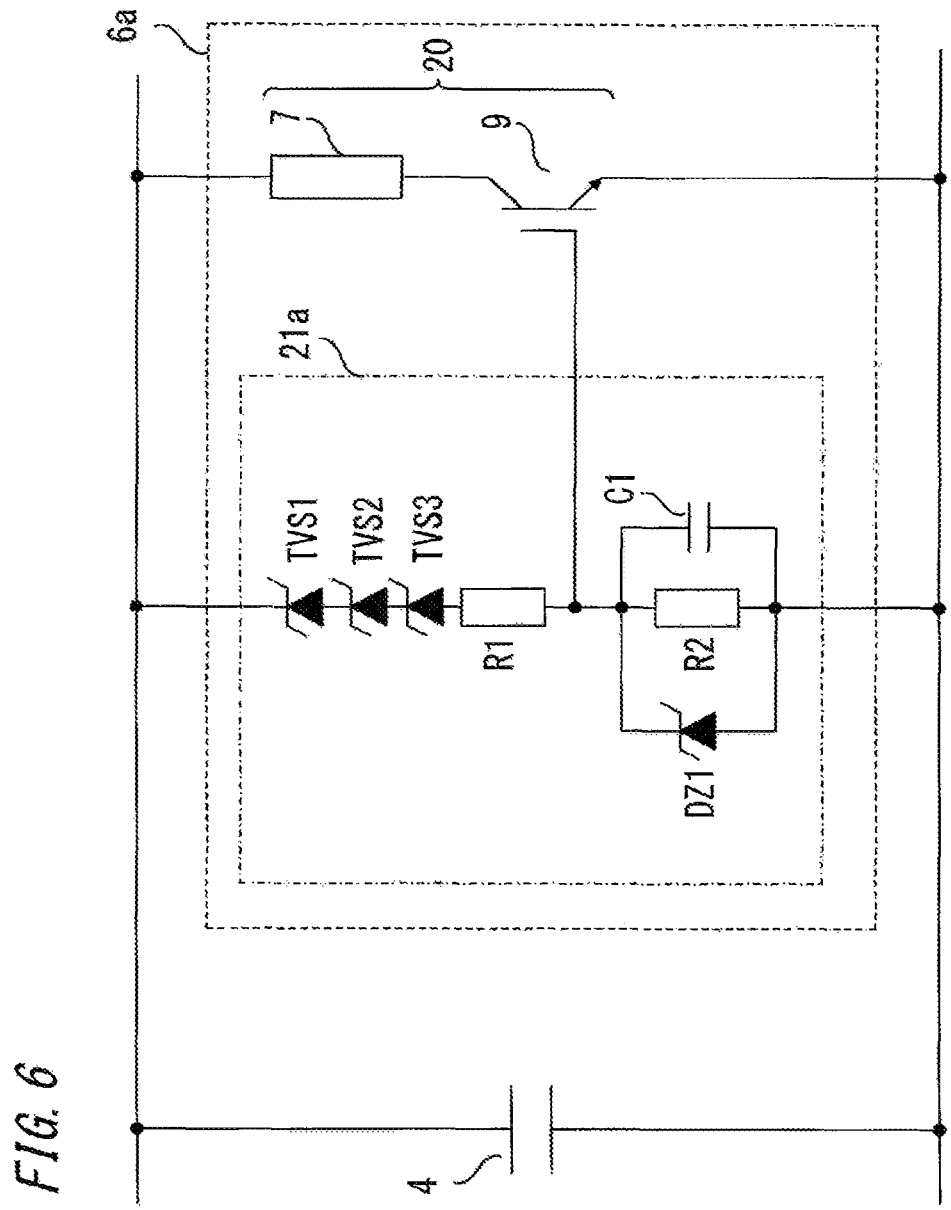
FIG. 6 is a diagram showing a second configuration example of the overvoltage protection unit according to embodiment 1 of the present invention.

FIG. 6 is a diagram showing a second configuration example of the overvoltage protection unit. An overvoltage protection unit 6a in this second configuration example is also applicable to embodiment 1 in the same manner.

The overvoltage protection unit 6a, is composed of: a first determination circuit 21a for performing determination as to the smoothing capacitor voltage Vfc which is input voltage of the inverter 1; the IGBT 9 the conduction state of which is controlled on the basis of an output signal from the first determination circuit 21a; and the discharge resistor 7 connected in series to the IGBT 9. The discharge circuit 20 which is a series circuit of the discharge resistor 7 and the IGBT 9 is connected between both terminals of the smoothing capacitor 4.

The first determination circuit 21a includes; resistors R1, R2, a capacitor C1, suppressor elements TVS1 to TVS3 as transient voltage suppressor elements such as avalanche diodes of varistors, and a Zener diode DZ1.

In this case, the first determination circuit 21a uses a voltage breakdown phenomenon of the suppressor elements TVS1 to TVS3. The suppressor elements TVS1 to TVS3 are configured so as to cause voltage breakdown when the smoothing capacitor voltage Vfc exceeds the first set voltage. When the suppressor elements TVS1 to TVS3 cause voltage breakdown, current flows through the resistors R1, R2, whereby gate voltage is applied to the IGBT 9. Here, the Zener diode DZ1 is provided for the purpose of preventing overvoltage from being applied to the gate of the IGBT 9. The capacitor C1 serves for a low-pass filter as in the first configuration example.

In the first determination circuit 21a, there is variation among breakdown voltages of the suppressor elements TVS1 to TVS3, and therefore it is difficult to enhance accuracy of determination voltage. However, the first determination circuit 21a has no circuit component that requires a power supply, and therefore can operate without the need of a power supply.

In the above example, three suppressor elements are connected in series in the first determination circuit 21a, but the present invention is not limited thereto.

Figure 7:
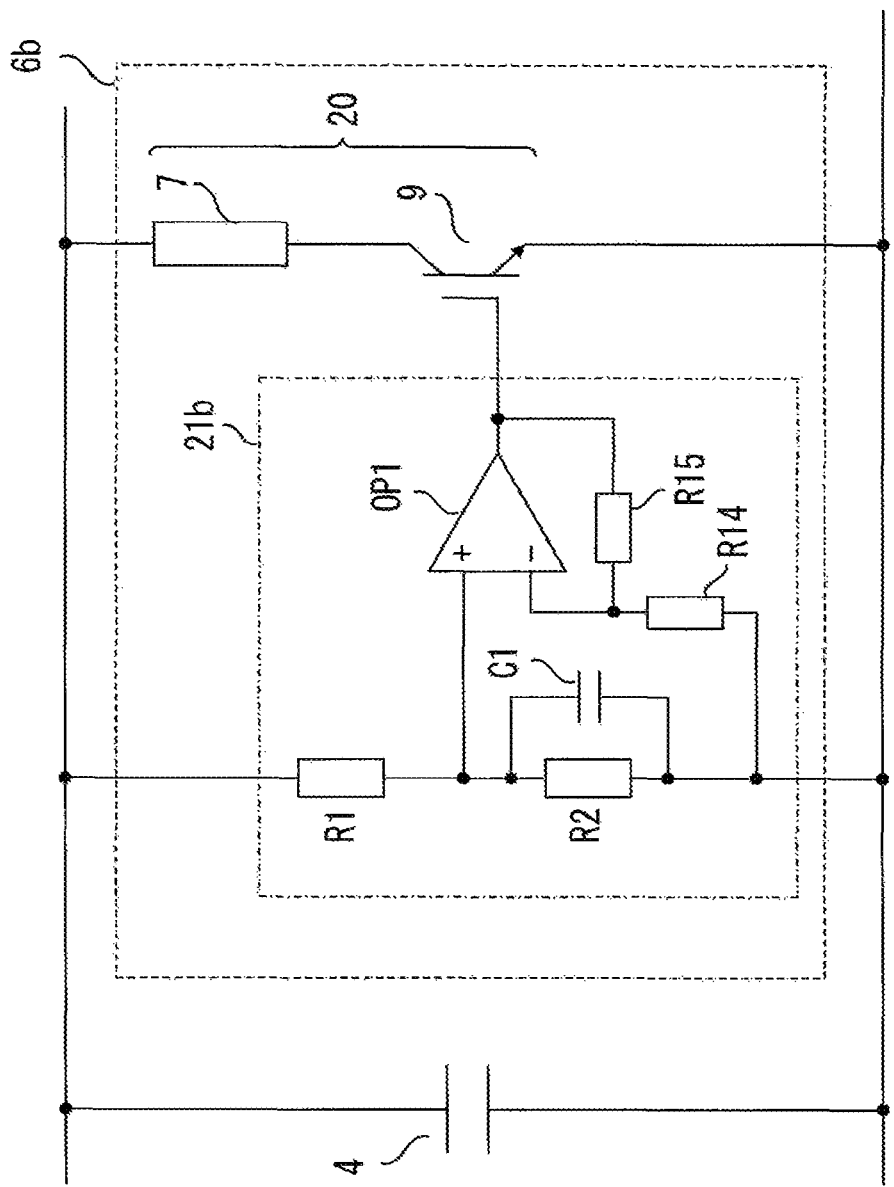
FIG. 7 is a diagram showing a third configuration example of the overvoltage protection unit according to embodiment 1 of the present invention.

FIG. 7 is a diagram showing a third configuration example of the overvoltage protection unit. An overvoltage protection unit 6b in this third configuration example is also applicable to embodiment 1 in the same manner.

The overvoltage protection unit 6b is composed of: a first determination circuit 21b for performing determination as to the smoothing capacitor voltage Vfc which is input voltage of the inverter 1; the IGBT 9 the conduction state of which is controlled on the basis of an output signal from the first determination circuit 21b; and the discharge resistor 7 connected in series to the IGBT 9. The discharge circuit 20 which is a series circuit of the discharge resistor 7 and the IGBT 9 is connected between both terminals of the smoothing capacitor 4.

The first determination circuit 21b includes resistors R1, R2, a capacitor C1, an operational amplifier OP1, and resistors R14, R15.

The first determination circuit 21b is configured by replacing the comparator CP1 of the first determination circuit 21 in the first configuration example with the operational amplifier OP1. Thus, a drive force at the output of the first determination circuit 21b increases, and therefore the gate drive circuit 14 can be removed.

Figure 8:
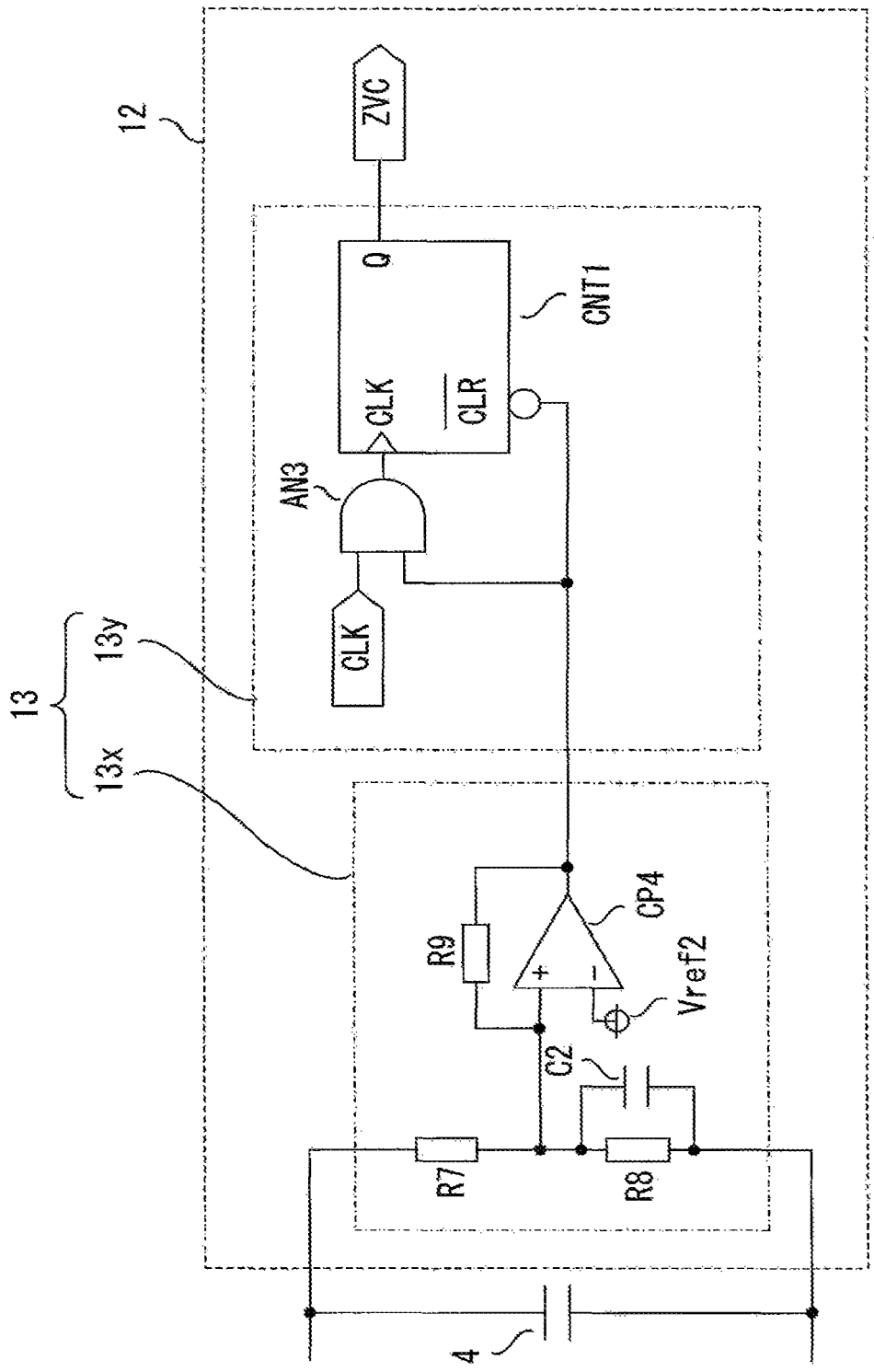
FIG. 8 is a diagram showing the configuration of a phase short-circuit control unit according to embodiment 1 of the present invention.

FIG. 8 is a diagram showing the configuration of the phase short-circuit control unit 12. It is noted that this configuration is merely an example and the present invention is not limited thereto.

As described above, the phase short-circuit control unit 12 includes the second determination circuit 13 for determining that the smoothing capacitor voltage Vfc exceeds the second set voltage Vfcz in the case of abnormality such as load dump. If the smoothing capacitor voltage Vfc exceeds the second set voltage Vfcz, the second determination circuit 13 generates the phase short-circuit command ZVC.

The second determination circuit 13 includes an overvoltage detection circuit 13x as a detection circuit and a sampling circuit 13y as a determination delay circuit;

The overvoltage detection circuit 13x has the same configuration as the first determination circuit 21 of the overvoltage protection unit 6 shown in FIG. 5, and includes resistors R7, R8 for dividing the smoothing capacitor voltage Vfc, a capacitor C2, a comparator CP4, and a resistor R9.

In the overvoltage detection circuit 13x, the smoothing capacitor voltage Vfc is divided by the resistor R7 and the resistor R8, and the comparator CP4 performs determination as to the divided voltage. The comparator CP4 with the resistor R9 connected between the positive input terminal and the output terminal thereof operates as a hysteresis comparator. Reference voltage Vref2 is inputted to the negative input terminal of the comparator CP4.

The resistors R7, R8 and the reference voltage Vref2 are set such that the voltage divided by the resistors R7, R8 exceeds the reference voltage Vref2 when the smoothing capacitor voltage Vfc exceeds the second set voltage Vfcz. When the smoothing capacitor voltage Vfc exceeds the second set voltage Vfcz, the overvoltage detection circuit 13x outputs a signal detecting overvoltage.

It is noted that the second set voltage Vfcz is equal to or smaller than the low-voltage-side first set voltage Vfc1 of the first determination circuit 21.

The sampling circuit 13y includes: a clock circuit for generating a control cycle signal CLK in every control cycle of the control device 5; an AND circuit AN3; and a counter circuit CNT1. The counter circuit CNT1 samples output of the overvoltage detection circuit 13x in every control cycle, and when the counter circuit CNT1 has counted set plural times (N times) of events, the counter circuit CNT1 generates the phase short-circuit command ZVC. The counter circuit CNT1 outputs the phase short-circuit command ZVC when having consecutively received signals detecting overvoltage from the overvoltage detection circuit 13x over N control cycles.

Even if an impulse noise is superimposed on the input wiring of the overvoltage detection circuit 13x and the counter circuit CNT1 receives the erroneous signal, the counter circuit CNT1 resets the count when the signal returns to be normal.

Since the second determination circuit 13 has the sampling circuit 13y at a stage subsequent to the overvoltage detection circuit 13x, the phase short-circuit command ZVC is outputted with delay after it is detected that the smoothing capacitor voltage Vfc exceeds, the second set voltage Vfcz. The determination period Tzvc required for the second determination circuit 13 to output the phase short-circuit command ZVC is set on the basis of a time period obtained by adding a time period of N control cycles and a time period required for the overvoltage detection circuit 13x to detect overvoltage, and considering other delays therefor.

As described above, the second determination circuit 13 has the sampling circuit 13y at a stage subsequent to the overvoltage detection circuit 13x, to generate the phase short-circuit command ZVC, and thus can prevent erroneous determination due to noise.

Instead of the sampling circuit 13y configured by the counter circuit CNT1, for example, a filter circuit such as a low-pass filter may be used as a determination delay circuit. Also in this case, erroneous determination due to noise can be prevented in the same manner.

As described above, in the present embodiment 1, the electric motor drive device 100 includes the overvoltage protection unit 6 and the phase short-circuit control unit 12. The phase short-circuit control unit 12 is provided in the control device 5, and the overvoltage protection unit 6 is configured independently of the phase short-circuit control unit 12. The second set voltage Vfcz used for determination by the second determination circuit 13 in the phase short-circuit control unit 12 is equal to or smaller than the first set voltage Vfcm (or voltage Vfcl) used for determination by the first determination circuit 21 in the overvoltage protection unit 6. In addition, the determination period Tzvc required for the phase short-circuit control unit 12 to perform voltage determination is longer than the determination delay Tov of the first determination circuit 21.

In the electric motor drive device 100 configured as described above, first, regenerative power occurring in the case of abnormality is consumed in the discharge resistor 7 of the overvoltage protection unit 6 so that the smoothing capacitor voltage Vfc is suppressed, and thereafter, when the determination period Tzvc of the second determination circuit 13 has elapsed, flow of the regenerative power into the smoothing capacitor 4 is stopped by phase short-circuit control of the inverter 1 by the phase short-circuit control unit 12.

Since the second set voltage Vfcz is equal to or smaller than the first set voltage Vfcm (or voltage Vfcl), the smoothing, capacitor voltage Vfc can be prevented from becoming equal to or smaller than the second set voltage Vfcz through over-discharge operation of the overvoltage protection unit 6 in the case where the regenerative power is smaller than the maximum regenerative power Pmax. Thus, the phase short-circuit control of the inverter 1 by the phase short-circuit control unit 12 can be reliably operated.

By the phase short-circuit control of the inverter 1, the regenerative power flows back in the electric motor 2. Therefore, the period of flow of the regenerative power into the smoothing capacitor 4 and the period of processing for the regenerative power by the overvoltage protection unit 6 end by the time of starting the phase short-circuit Control of the inverter 1.

Therefore, the smoothing capacitor 4 can be downsized, and the period for processing the regenerative power by the overvoltage protection unit 6 can be shortened, whereby load on the overvoltage protection unit 6 can be reduced. In the overvoltage protection unit 6, as compared to the case of processing regenerative power by only the overvoltage protection unit 6, load on the discharge circuit 20 can be reduced and as a result, small-size components can be used. Further, voltage increase in the smoothing capacitor 4 can be reliably suppressed.

In actual designing, the first set voltage Vfcm (or voltage Vfcl) is designed by adding a margin to the second set voltage Vfcz in consideration of voltage undershoot due to circuit operation delay or the like.

The determination period Tzvc of the phase short-circuit control unit 12 is set to be longer than the determination delay Tov of the first determination circuit 21, and the phase short-circuit control unit 12 outputs the phase short-circuit command ZVC when having detected overvoltage over plural times of control cycles. Thus, it is possible to prevent erroneous operation of the phase short-circuit control unit 12 due to noise superimposed on a signal input part of the computing processing unit in the control device 5.

In addition, since the overvoltage protection unit 6 is configured independently of the phase short-circuit control unit 12, mounting can be made so as to prevent noise from entering the first determination circuit 21 in the overvoltage protection unit 6, whereby erroneous operation of the overvoltage protection unit 6 can be prevented. As an example, the control device 5 is mounted on a control printed board separated from the main circuit, and as for the overvoltage protection unit 6, the first determination circuit 21 formed from a simple analog determination circuit is mounted just near a voltage, measurement point for the smoothing capacitor 4.

Further, in the present embodiment 1, the determination period Tzvc is set such that the maximum regenerative power Pmax occurring in the electric motor 2 does not exceed the permissible power P(Tzvc) of the discharge resistor 7 with respect to a time width equivalent to the determination period Tzvc of the second determination circuit 13, and thus the discharge resistor 7 is prevented from being overloaded. In addition, it is possible to set an appropriate determination period Tzvc in accordance with characteristics of the discharge resistor 7, and the components of the discharge resistor 7 can be downsized.

The determination period Tzvc is set on the basis of characteristics of the permissible power with respect to a pulse width in the discharge resistor 7. Such setting is enabled because the period for processing the regenerative power by the overvoltage protection unit 6 can be shortened and because abnormality such as load dump occurs with low frequency and therefore deterioration in the discharge resistor 7 need not be considered.

In the case where the regenerative power is smaller than the maximum regenerative power Pmax, as a method for preventing the overvoltage protection unit 6 from intermittently repeating discharge operation, the following method may be used.

This method uses feedback control in which the gate voltage of the IGBT 9 of the overvoltage protection unit 6 is varied in accordance with the smoothing capacitor voltage Vfc. For example, control is performed such that, when the smoothing capacitor voltage Vfc decreases by discharging, the gate voltage of the IGBT 9 is reduced and ON voltage of the IGBT 9 is increased. This control can suppress oscillation operation but increases conduction loss of the IGBT 9. Therefore, it is necessary to increase the capacitance of the element.

Embodiment 2

Figure 9:
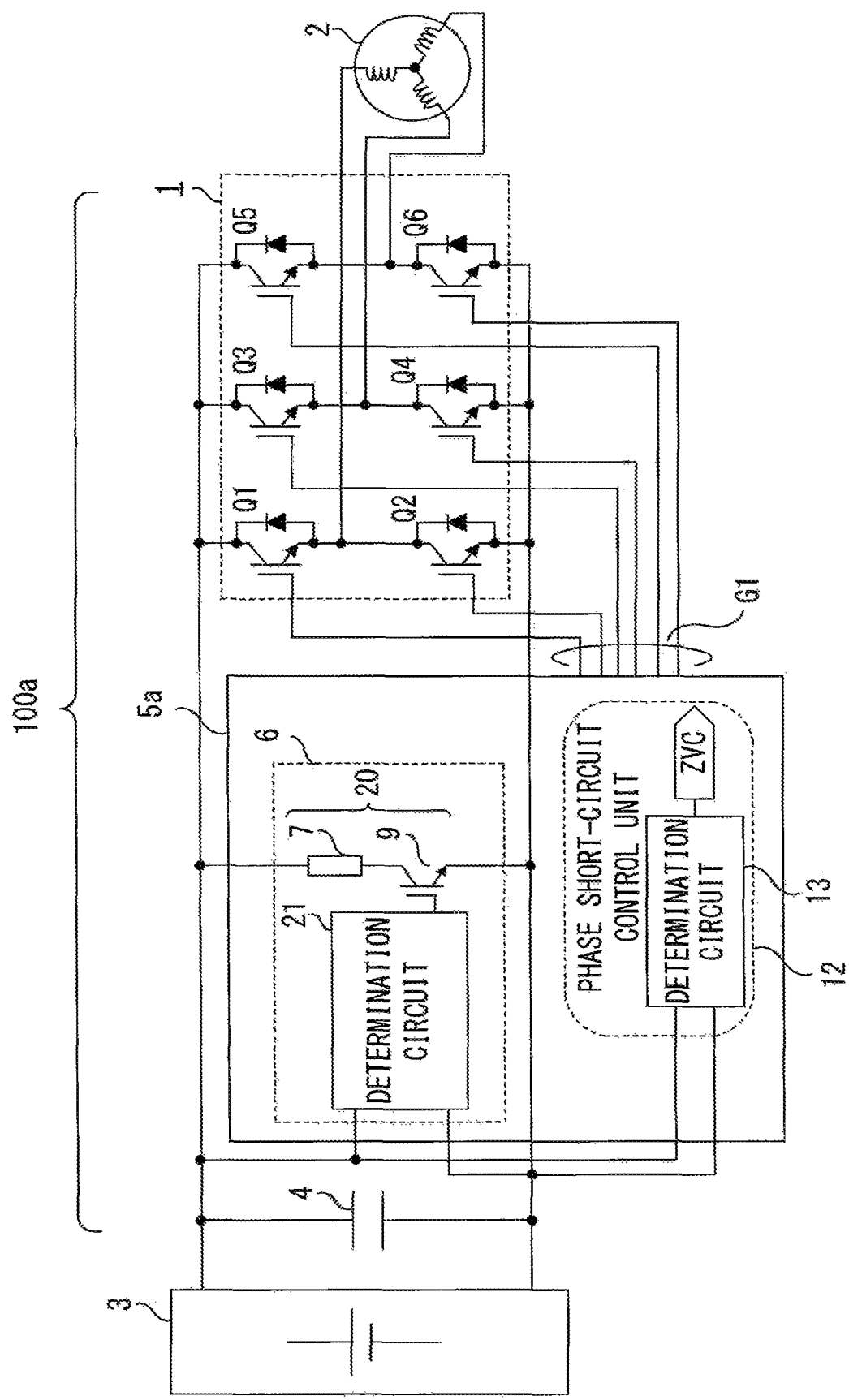
FIG. 9 is a diagram showing the schematic configuration of an electric motor drive device according to embodiment 2 of the present invention.

Next, embodiment 2 of the present invention will be described. FIG. 9 is a diagram showing the schematic configuration of an electric motor drive device 100a according to embodiment 2 of the present invention.

In the present embodiment 2, the overvoltage protection unit 6 is mounted integrally with the control device 5a. This configuration assumes that the first determination circuit 21 can be located just near the voltage measurement point on the main circuit by, for example, integrating the inverter 1 and the control device 5a with each other. The other configurations are the same as in the above embodiment 1, and the same operations are performed.

Also in the present embodiment 2, since the first determination circuit 21 and the second determination circuit 13 are configured independently of each other, the same effects as in the above embodiment 1 can be provided.

Embodiment 3

Figure 10:
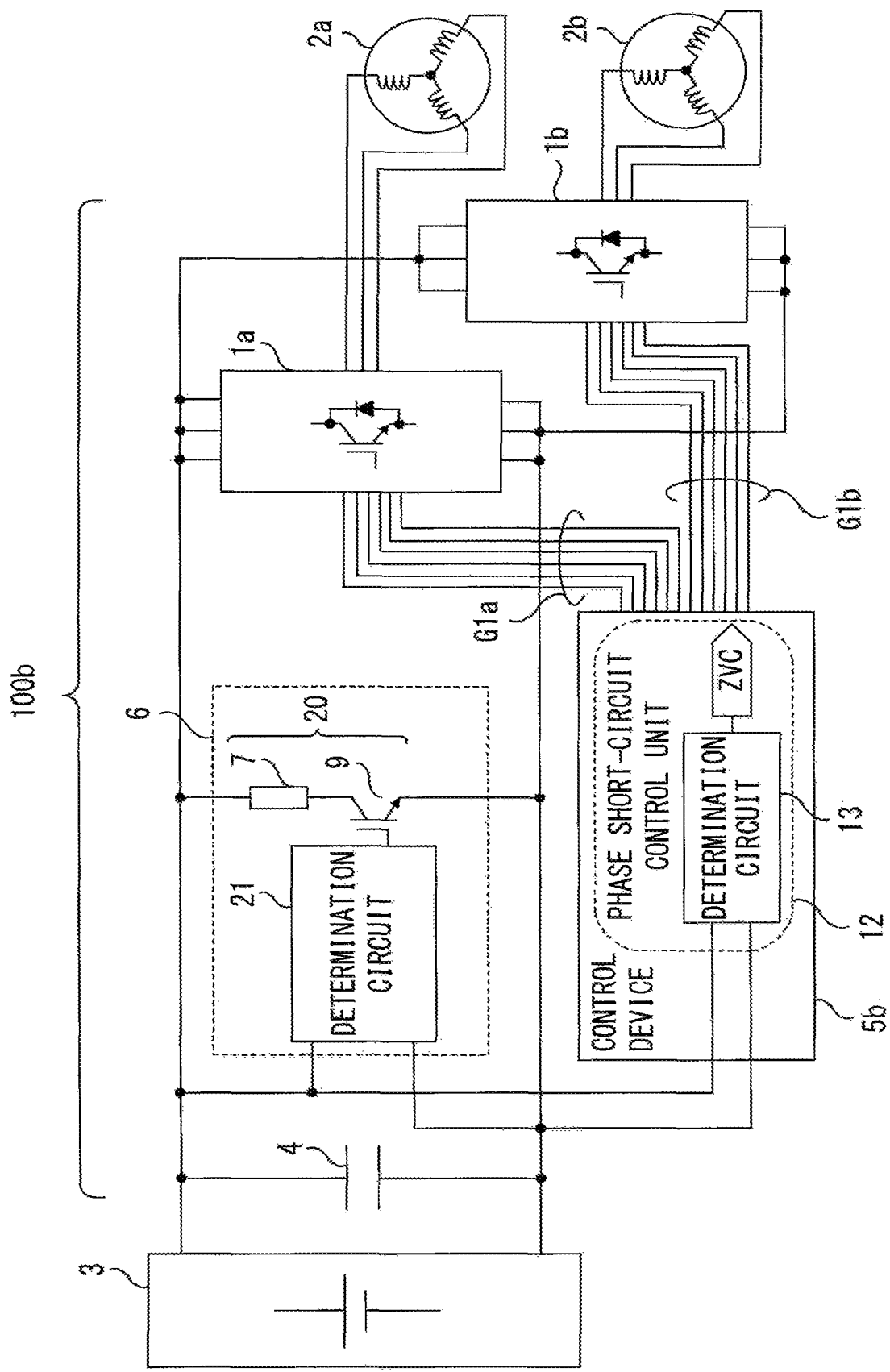
FIG. 10 is a diagram showing the schematic configuration of ah electric motor drive device according to embodiment 3 of the present invention.

Next, embodiment 3 of the present invention will be described. FIG. 10 is a diagram showing the schematic configuration of an electric motor drive device 100b according to embodiment 3 of the present invention.

As shown in FIG. 10, the electric motor drive device 100b is configured to drive two electric motors 2a, 2b, and includes two inverters 1a, 1b for driving the respective electric motors 2a, 2b. Further, the electric motor drive device 100b includes: a smoothing capacitor 4 connected in parallel to a DC power supply 3; a control device 5b for controlling the inverters 1a, 1b; and an overvoltage protection unit 6. It is noted that the electric motors 2a, 2b are each capable of both drive operation and regenerative operation.

The inverters 1a, 1b have the same configuration as the inverter 1 in the above embodiment 1, and the control device 5b generates gate signals G1a, G1b to control power-running operation and regenerative operation of the inverters 1a, 1b.

In this case, the maximum regenerative power Pmax is the maximum value of the sum of regenerative powers of the two electric motors 2a, 2b. The phase short-circuit control by the phase short-circuit control unit 12 is applied to the two inverters 1a, 1b. The other configurations and operations are the same as in the above embodiment 1, and the same effects as in embodiment 1 can be obtained.

Such an electric motor drive device 100b is used for, as an example, a system including the electric motor 2a mainly for driving a load and the electric motor 2b mainly for electric generation, e.g., a system in a hybrid vehicle.

Embodiment 4

Hereinafter, embodiment 4 of the present invention will be described.

Figure 11:
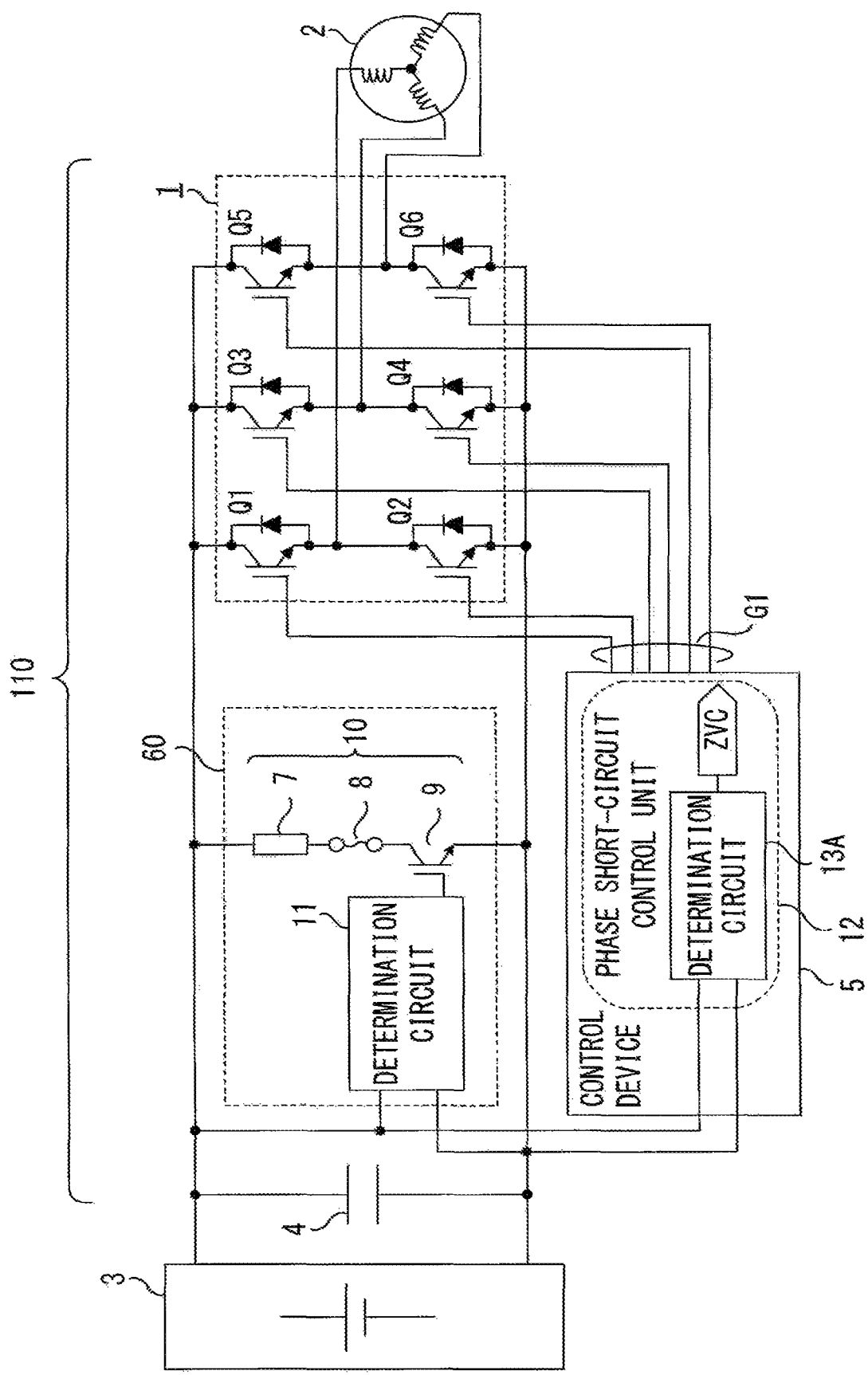
FIG. 11 is a diagram showing the schematic configuration of an electric motor drive device according to embodiment 4 of the present invention.

FIG. 11 is a diagram showing the schematic configuration of an electric motor drive device according to embodiment 4 of the present invention.

As shown in FIG. 11, the electric motor drive device 110 is configured to convert DC power from a DC power supply 3 to AC power by an inverter 1 and drive an electric motor 2, and includes: the inverter 1; a smoothing capacitor 4 connected in parallel to the DC power supply 3; a control device 5 for controlling the inverter 1; and an overvoltage protection unit 60. It is noted that the electric motor 2 is capable of both drive operation and regenerative operation.

The inverter 1 is configured to be a three-phase bridge circuit having IGBTs Q1 to Q6 as semiconductor switching elements to which diodes are respectively connected in antiparallel, and converts DC power of the smoothing capacitor 4 to three-phase AC power, thereby driving the electric motor 2. It is noted that the semiconductor switching elements Q1 to Q6 composing the inverter 1 are not limited to IGBTs, but may be other self-turn-off semiconductor switching elements such as MOSFETs.

The control device 5 includes a computing processing unit such as GPU (not shown), and performs a computing process with a predetermined control cycle, to generate gate signals G1 for controlling switching of the IGBTs Q1 to Q6 in the inverter 1, thereby controlling power-running operation and regenerative operation of the inverter 1. The control device 5 further includes a phase short-circuit control unit 12 described later.

The overvoltage protection unit 60 includes: a discharge circuit 10 in which a discharge resistor 7, a fuse 8, and an IGBT 9 as a semiconductor switching element are connected in series; and a first determination circuit 11 for performing determination as to voltage of the smoothing capacitor 4 which is input voltage of the Inverter 1. The discharge circuit 10 is connected between both terminals of the smoothing capacitor 4, and the conduction state of the IGBT 9 is controlled on the basis of an output signal from the first determination circuit 11. It is noted that the semiconductor switching element used in the discharge circuit 10 is not limited to the IGBT 9 but may be another self turn-off semiconductor switching element.

It is noted that the fuse 8 is an irreversible type in which a conduction part is to be melted, but is not limited thereto. A reversible type in which current tripping is caused by heat generation may be used. The reversible type has an advantage of being capable of self-resetting when an overload state is eliminated, but the current trip retention period is limited.

In the case of abnormality such as load dump, the first determination circuit 11 determines that smoothing capacitor voltage Vfc which is voltage; of the smoothing capacitor 4 exceeds first set voltage Vfcm, and then if the smoothing capacitor voltage Vfc exceeds the first set voltage Vfcm, the first determination circuit 11 outputs a signal (hereinafter, ON signal) for turning on the IGBT 9. The overvoltage protection unit 60 causes current to flow through the discharge resistor 7 by turning on the IGBT 9, thereby absorbing regenerative power from the electric motor 2 and preventing overvoltage in a main circuit of the electric motor drive device 110.

The phase, short-circuit control unit 12 includes a second determination circuit 13A for determining that the smoothing capacitor voltage Vfc exceeds second set voltage Vfcz in the case of abnormality such as load dump. If the smoothing capacitor voltage Vfc exceeds the second set voltage Vfcz, the second determination circuit 13A generates a phase short-circuit, command ZVC which is a determination signal, and the control device 5 controls the inverter 1 so as to bring the electric motor 2 into a phase short-circuited state. The second set voltage Vfcz is equal, to or smaller than the first set Voltage Vfcm used by the first determination circuit 11 in the overvoltage protection unit 60.

Here, the phase short-circuited state means that, for example, the semiconductor switching elements Q1, Q3, Q5 or the semiconductor switching elements Q2, Q4, Q6 are turned on so that current flows back into the electric motor 2.

In the above description, the case where the first set voltage used by the first determination circuit 11 in the overvoltage protection unit 60 is a single voltage value, has been shown. However, in general, first set voltages (Vfch, Vfcl (<Vfch)) having a hysteresis width (Vfch-Vfcl) are used in order to prevent oscillation of the first determination circuit 11. In this case, when the smoothing capacitor voltage Vfc exceeds the voltage Vfch, the first determination circuit 11 outputs an ON signal to turn on the IGBT 9, and thereafter, when the smoothing capacitor voltage Vfc has become equal to or smaller than the voltage Vfcl, the first determination circuit 11 stops output of the ON signal, to turn off the IGBT 9. It is noted that the second set voltage Vfcz used by the second determination circuit 13A in the phase short-circuit control unit 12 is equal to or smaller than the voltage Vfcl.

In the following description, for the purpose of simplification, it is assumed that the first determination circuit 11 uses the first set voltage Vfcm without providing a hysteresis width.

Figure 12:
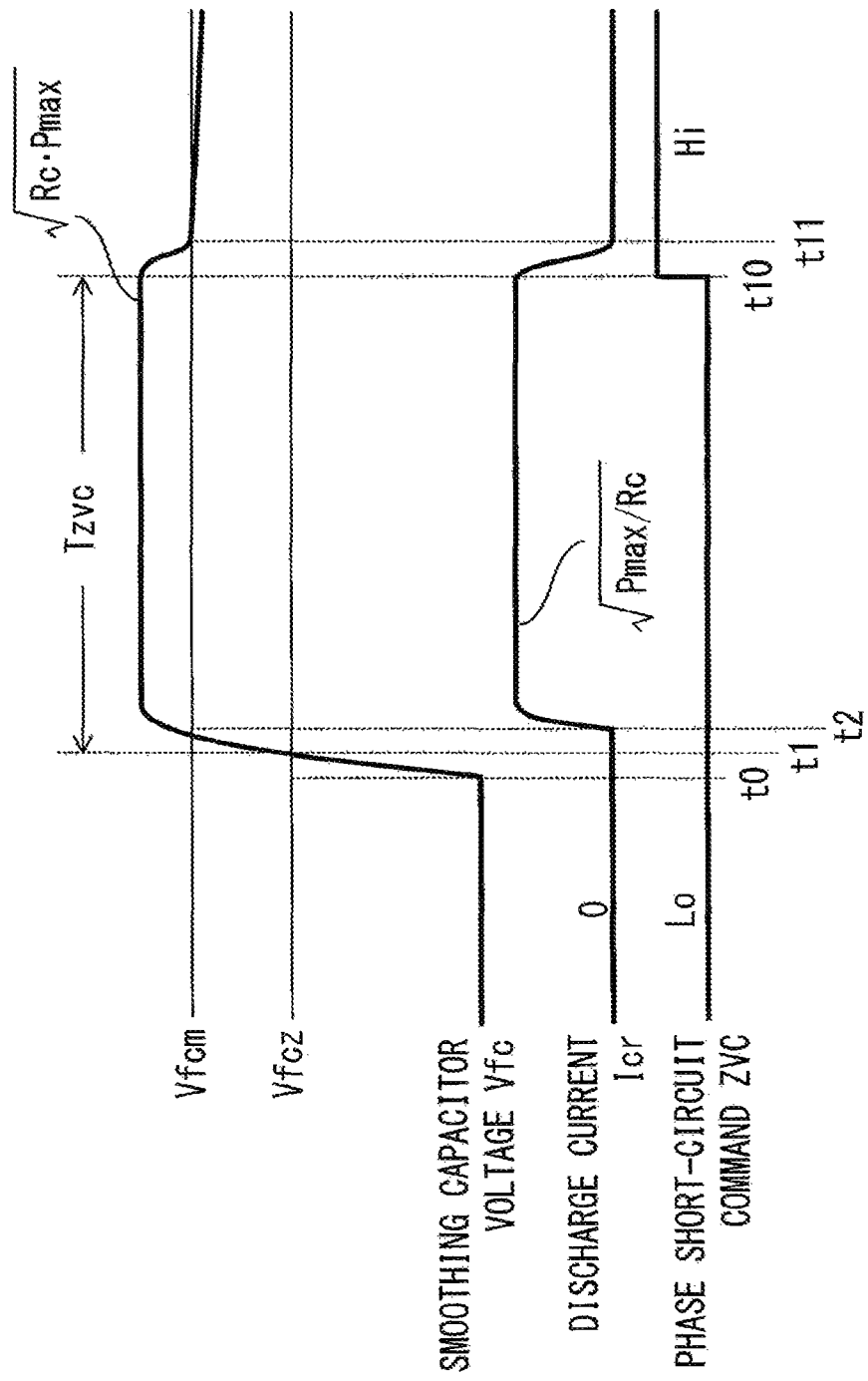
FIG. 12 is a waveform diagram illustrating protection operation of the electric motor drive device according to embodiment 4 of the present invention.

FIG. 12 is a diagram illustrating protection operation of the electric motor drive device 110, and shows waveforms of the smoothing capacitor voltage Vfc, discharge current Icr flowing through the discharge resistor 7, and the phase short-circuit command ZVC generated by the phase short-circuit control unit 12. Hereinafter, during regenerative, operation of the electric motor 2, protection operation for protecting the main circuit of the electric motor drive device 110 from overvoltage when a load dump has occurred which is abnormality in which connection between the smoothing capacitor 4 and the DC power supply 3 is opened, will be described with reference to FIG. 12. In this case, the electric motor 2 performs regenerative operation at maximum regenerative power Pmax.

At time t0, a load dump occurs in a state in which the maximum regenerative power Pmax is generated. At this time, power is injected into the smoothing capacitor 4 from the electric motor 2 via the inverter 1, whereby the smoothing capacitor voltage Vfc increases.

At time t1, when the smoothing capacitor voltage Vfc exceeds the second set voltage Vfcz, the second determination circuit 13A in the phase short-circuit control unit 12 starts determination operation for generating the phase short-circuit command ZVC. It is noted that, if a state in which the smoothing capacitor voltage Vfc exceeds the second set voltage Vfcz has continued during a determination period Tzvc, the second determination circuit 13A outputs the phase short-circuit command ZVC.

At time t2, when the smoothing capacitor voltage Vfp exceeds the first set voltage Vfcm, the first determination circuit 11 in the overvoltage protection unit 60 outputs an ON signal to turn on the IGBT 9, so that current flows through the discharge resistor 7.

As a result, the smoothing capacitor voltage Vfc is clamped at voltage √(Rc·Pmax) at which the maximum regenerative power Pmax and discharge power which is power consumed by the discharge resistor 7 having a resistance value Rc are balanced. At this time, the discharge current Icr is √(Pmax/Rc).

The resistance value Rc of the discharge resistor 7 is set so that the clamp voltage √(Rc·Pmax) for the smoothing capacitor voltage Vfc becomes equal to or smaller than the withstand voltage of the main circuit. In actuality, a determination delay Tov of the first determination circuit 11, an operation delay of the IGBT 9, and the like occur. Therefore, in consideration of voltage overshoot due to the above phenomena, the resistance value Rc of the discharge resistor 7 is set. The determination delay Tov of the first determination circuit 11 is a time period required for outputting an ON signal when the smoothing capacitor voltage Vfc exceeds the first set voltage Vfcm, i.e., a time period required for voltage determination. The determination delay Tov is sufficiently shorter than the determination period Tzvc for the second determination circuit 13A, and therefore is not shown in the drawing.

At time t10, which is a timing when a state in which the smoothing capacitor voltage Vfc exceeds the second set Voltage Vfcz has continued during the determination period Tzvc, the second determination circuit 13A generates the phase short-circuit command ZVC (Hi signal). Then, the control device 5 controls the inverter 1 so as to bring the electric motor 2 into a phase short-circuited state. Thus, current flows back into the electric motor 2 and regenerative power is consumed in the electric motor 2, while flow of power into the smoothing capacitor 4 is stopped. After time t10, the smoothing capacitor voltage Vfc decreases by discharging through the discharge resistor 7, and the discharge current Icr also decreases.

At time t11, when the smoothing capacitor voltage Vfc becomes equal to or smaller than the first set voltage Vfcm, the first determination circuit 11 stops output of the ON signal, to turn off the IGBT 9. Thus, discharge operation by the overvoltage protection unit 60 is stopped and the discharge current Icr becomes 0.

In the case where the regenerative power is smaller than the maximum regenerative power Pmax, the discharge power of the discharge resistor 7 exceeds the regenerative power, and therefore, as the discharge operation is started, the smoothing capacitor voltage Vfc decreases and the discharge current Icr also decreases. Therefore, until the phase short-circuit command ZVC (Hi signal) is generated at time t10, ON/OFF operation of the IGBT 9 is repeated and the overvoltage protection unit 60 intermittently repeats discharge operation, so that the smoothing capacitor voltage Vfc is kept approximately near the first set voltage Vfcm.

Figure 13:
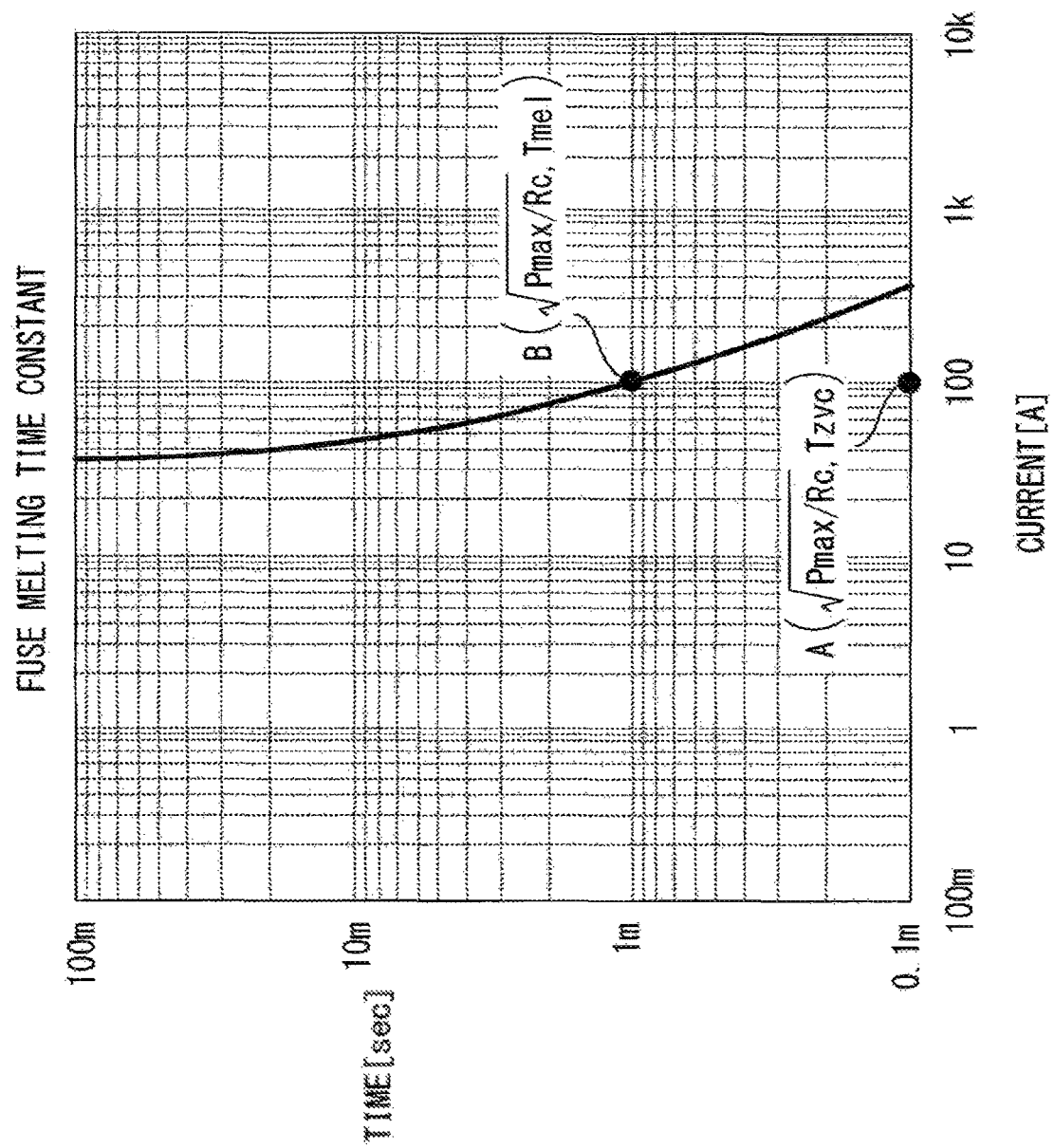
FIG. 13 shows a melting characteristics example of a fuse according to embodiment 4 of the present invention.

FIG. 13 shows a melting characteristics example of the fuse 8, and shows a melting time constant Tmel according to current flowing through the fuse 8 having a rated current of about 10 A. As shown in FIG. 13, even in the case of using a small-size component having a rated current of about 10 A, current of 100 A or greater is allowed to flow within 1 ms.

The discharge current ICr flows through the fuse 8 in the discharge circuit 10 of the overvoltage protection unit 60, and maximum discharge current √(Pmax/Rc) is defined by the resistance value Rc of the discharge resistor 7 and the maximum regenerative power Pmax.

As shown in FIG. 13, the determination period Tzvc (point A) of the second determination circuit 13A is set to be smaller than the melting time constant Tmel (point B) Of the fuse 8 at the maximum discharge current √(Pmax/Rc). In this case, the maximum discharge current √(Pmax/Rc) is 100 A, the melting time constant Tmel of the fuse 8 at the maximum discharge current √(Pmax/Rc) is 1 ms, and thus the determination period Tzvc (=0.1 ms) is a time width shorter than the melting time constant Tmel (=1 ms) of the fuse 8.

That is, the fuse 8 of which the melting time constant Tmel at the maximum discharge current √(Pmax/Rc) is greater than the determination period Tzvc of the second determination circuit 13A is connected in series to the discharge resistor 7.

The discharge operation with use of the discharge circuit 10 is performed during a period in which the IGBT 9 is turned on and discharge current Icr flows. As shown in FIG. 12, when the second determination circuit 13A generates the phase short-circuit command ZVC (Hi signal) after the determination period Tzvc has elapsed, regeneration of power to the smoothing capacitor 4 is stopped and the discharge current Icr sharply decreases to 0. That is, normally, a period during which the discharge current Icr due to the regenerative power flows is shorter than the determination period Tzvc of the second determination circuit 13A, and a phenomenon of discharge operation in which great discharge current Icr flows beyond the determination period Tzvc occurs at the time of abnormality such as noise erroneous operation.

In the present embodiment, the fuse 8 of which the melting time constant Tmel at the maximum discharge current is greater than the determination period Tzvc is used, and thus, in the case of abnormality such as noise erroneous operation as described above, the fuse 8 is melted to prevent troubles such as heating or ignition of the discharge resistor 7.

Figure 14:
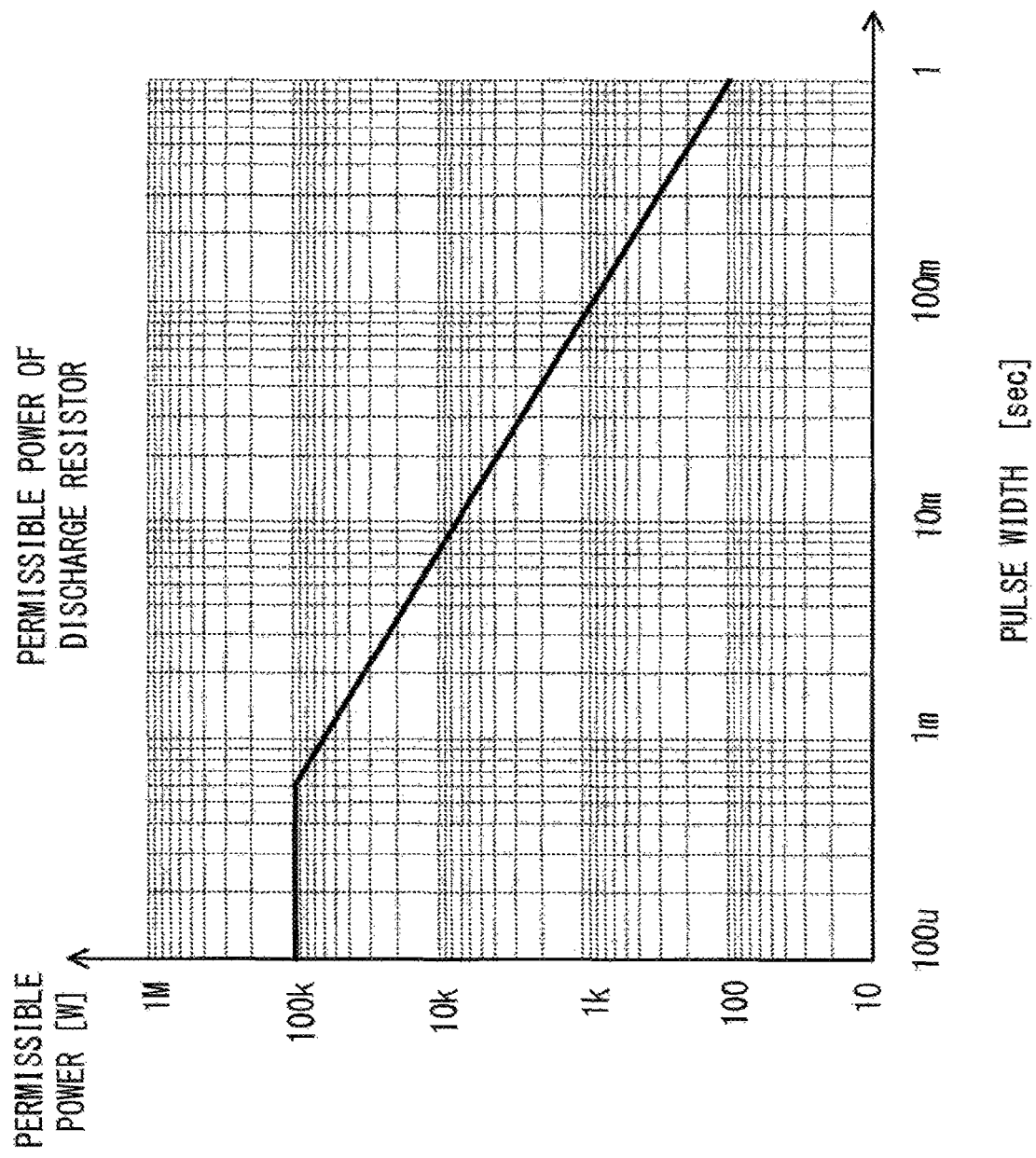
FIG. 14 shows a characteristics example of permissible power with respect to a pulse width in a discharge resistor according to embodiment 4 of the present invention.

FIG. 14 is a characteristics example of permissible power with respect to a pulse width in the discharge resistor 7. Permissible pulse power is schematically shown using, as an example, the discharge resistor 7 formed from a ceramic resistor having a rated power of several-ten W class.

As shown in FIG. 14, for example, injected power (permissible power) permissible in the discharge resistor 7 with respect to a pulse having a width of 1 ms is about 60 kW. That is, injected electric energy permissible in the discharge resistor 7 with respect to a pulse having a width of 1 ms is 60 kW×1 ms=60 J.

If the injected power permissible in the discharge resistor 7 is represented by a function P(tw) of a time width tw of a power pulse to be applied, injected power permissible in the discharge resistor 7 with respect to a pulse having a time width equivalent to the determination period Tzvc of the second determination circuit 13A is P(Tzvc).

The determination period Tzvc of the second determination circuit 13A is set so as to satisfy the following expression (1).

$$Pmax \leq P(Tzvc) \quad (1)$$

That is, the determination period Tzvc is set such that the maximum regenerative power Pmax generated by the electric motor 2 does not exceed permissible power P(Tzvc) of the discharge resistor 7 with respect to the time width equivalent to the determination period Tzvc of the second determination circuit 13A. For example, if the maximum regenerative power Pmax is 60 kW, from FIG. 14, the determination period Tzvc is set so as not to exceed 1 ms.

Instead of the permissible injected power P(tw) as shown in FIG. 14, a permissible electric energy W may be provided as characteristics of the discharge resistor 7 by a manufacturer. In this case, the determination period Tzvc of the second determination circuit 13A may be set so as to satisfy the following expression (2).

$$Pmax \cdot Tzvc \leq W \quad (2)$$

That is, the determination period Tzvc of the second determination circuit 13A is set such that an electric energy (Pmax·Tzvc) occurring when the maximum regenerative power Pmax has continued during the determination period Tzvc does not exceed the permissible electric energy W of the discharge resistor 7.

As shown in FIG. 12, in the case where the electric motor drive device 110 performs regenerative operation at the maximum regenerative power Pmax, the maximum regenerative power Pmax is regenerated also during the determination period Tzvc of the second determination circuit 13A, and during a major part of that period, i.e., between time t2 and time t10, the power is injected into the discharge resistor 7. By setting the determination period Tzvc of the second determination circuit 13A so as to satisfy the above expression (1) or expression (2), the discharge resistor 7 can be prevented from being overloaded. In addition, the determination period Tzvc can be set appropriately in accordance with the characteristics of the discharge resistor 7, and the components of the discharge resistor 7 can be downsized.

Figure 15:
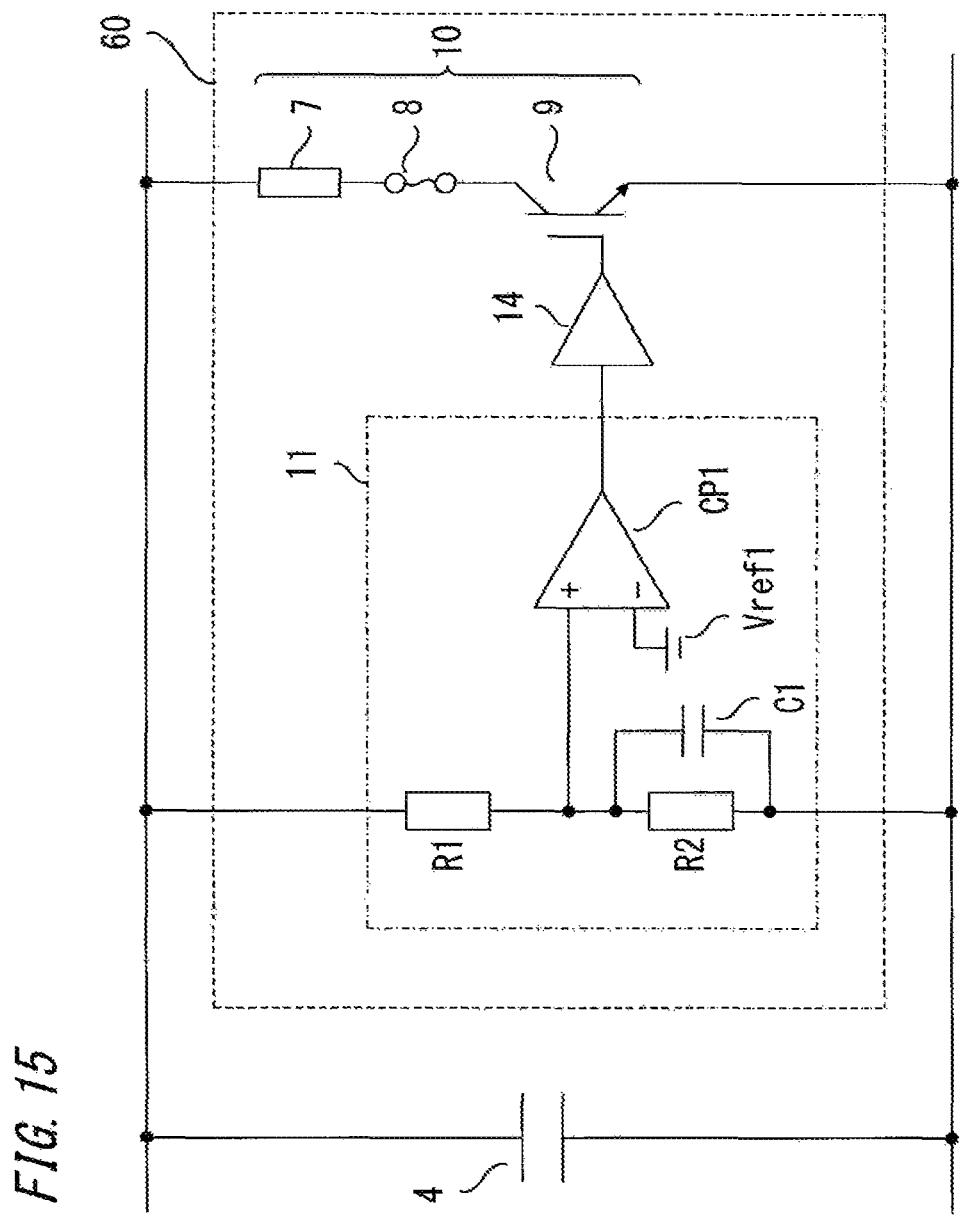
FIG. 15 is a diagram showing the configuration of an overvoltage protection unit according to embodiment 4 of the present invention.

FIG. 15 is a diagram showing the configuration of the overvoltage protection unit 60. It is noted that this configuration is merely an example and the present invention is not limited thereto.

As described above, the overvoltage protection unit 60 includes: the discharge circuit 10 in which the discharge resistor 7, the fuse 8, and the IGBT 9 are connected in series; and the first determination circuit 11 for performing determination as to the smoothing capacitor voltage Vfc which is input voltage of the inverter 1. The discharge circuit 10 is connected between both terminals of the smoothing capacitor 4, and the conduction state of the IGBT 9 in the discharge circuit 10 is controlled on the basis of an output signal from the first determination circuit 11.

The first determination circuit 11 includes resistors R1, R2 for dividing the smoothing capacitor voltage Vfc, a capacitor C1, and a comparator CP1. In addition, a gate drive circuit 14 is provided on the output side of the first determination circuit 11.

In the first determination circuit 11, the smoothing capacitor Voltage Vfc is divided by the resistor R1 and the resistor R2, and the comparator C1 performs determination as to the divided voltage. The capacitor C1 is provided for the purpose of forming a low-pass filter together with the resistor R1. Reference voltage Vref1 for the comparator CP1 is generated by a stable power supply or a Zener diode, or using a shunt regulator or the like, whereby accuracy of determination voltage can be enhanced.

It is noted that the resistors R1, R2 and the reference voltage Vref1 are set such that the voltage divided by the resistors R1, R2 exceeds the reference voltage Vref1 when the smoothing capacitor voltage Vfc exceeds the first set voltage Vfcm.

In this case, two resistors R1, R2 are used as voltage division resistors, but the present invention is not limited thereto. A low-pass filter is formed by the capacitor C1 and the resistor R1, but a general filter circuit may be provided.

Hysteresis may be provided for the determination in the comparator CP1.

The gate drive circuit 14 may be provided as necessary in the case where the drive force of the comparator CP1 is insufficient.

Figure 16:
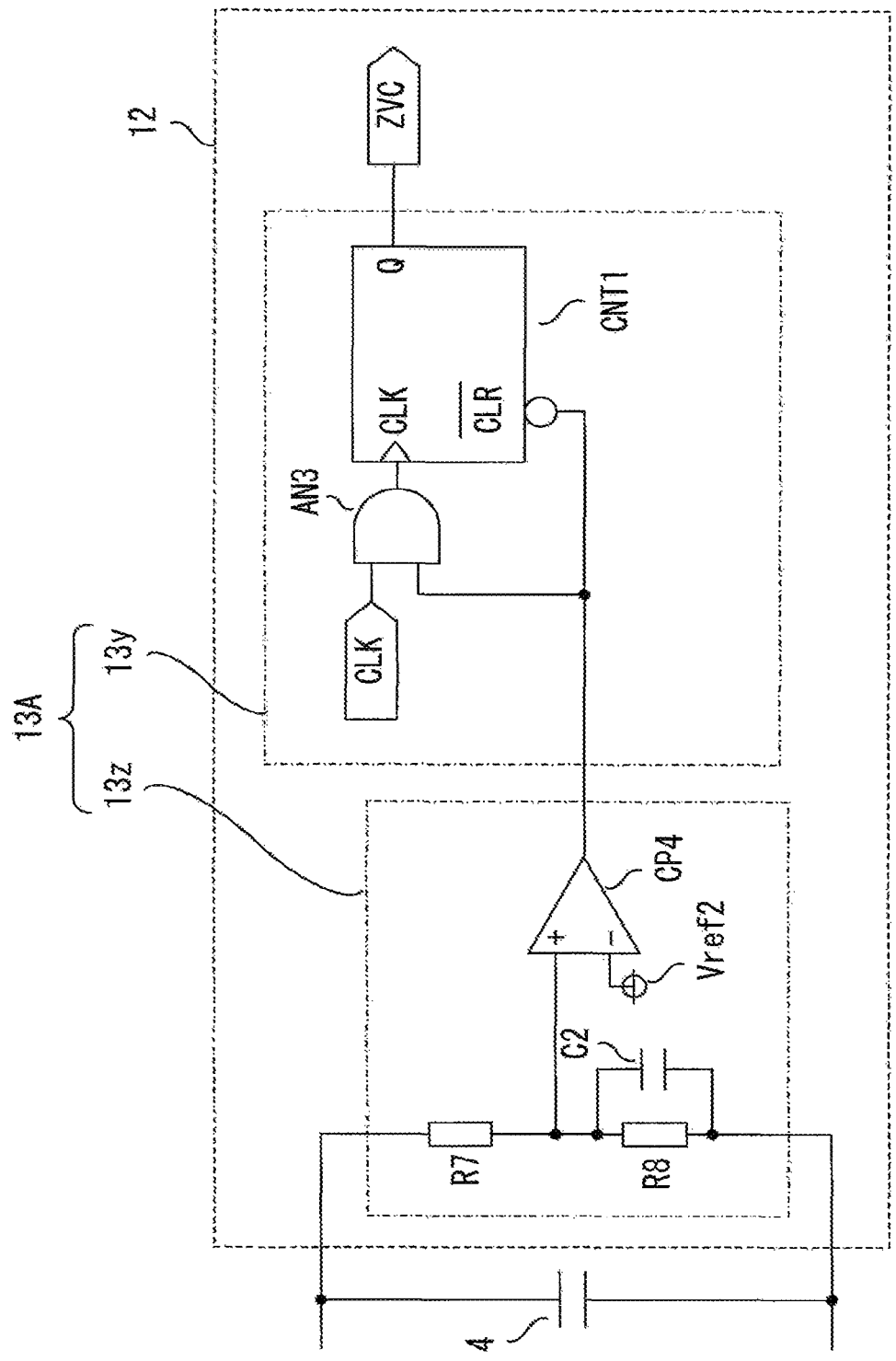
FIG. 16 is a diagram showing the configuration of a phase short-circuit control unit according to embodiment 4 of the present invention.

FIG. 16 is a diagram showing the configuration of the phase short-circuit control unit 12. It is noted that this configuration is merely an example and the present invention is not limited thereto.

As described above, the phase short-circuit control unit 12 includes the second determination circuit 13A for determining that the smoothing capacitor voltage Vfc exceeds the second set voltage Vfcz in the case of abnormality such as load dump. If the smoothing capacitor voltage Vfc exceeds the second set voltage Vfcz, the second determination circuit 13A generates the phase short-circuit; command ZVC.

The second determination circuit 13A includes an overvoltage detection circuit 13z as a detection circuit and a sampling circuit 13y as a determination, delay circuit.

The overvoltage detection circuit 13z has the same configuration as the first determination circuit 11 of the overvoltage protection unit 60 shown in FIG. 15, and includes resistors R7, R8 for dividing the smoothing capacitor voltage Vfc, a capacitor C2, and a comparator CP4.

In the overvoltage detection circuit 13z, the smoothing. Capacitor voltage Vfc is divided by the resistor R7 and the resistor R8, and the comparator CP4 performs determination as to the divided voltage. Reference voltage Vref2 is inputted to the negative input terminal of the comparator CP4.

The resistors R7, R8 and the reference voltage Vref2 are set such that the voltage divided by the resistors R7, R8 exceeds the reference voltage Vref2 when the smoothing capacitor Voltage Vfc exceeds the second set voltage Vfcz. When the smoothing capacitor voltage Vfc exceeds the second set voltage Vfcz, the overvoltage detection circuit 13z outputs a signal detecting overvoltage.

It is noted that the second set voltage Vfcz is equal to or smaller than the first set voltage Vfcm of the first determination circuit 11.

The sampling circuit 13y includes: a clock circuit for generating a control cycle signal CLK in every control cycle of the control device 5; an AND circuit AN3; and a counter circuit CNT1. The counter circuit CNT1 samples output of the overvoltage detection circuit 13a in every control cycle, and when the counter circuit CNT1 has counted set plural times (N times) of events, the counter circuit CNT1 generates the phase short-circuit command ZVC. The counter circuit CNT1 outputs the phase short-circuit command ZVC when having consecutively received signals detecting overvoltage from the overvoltage detection circuit 13z over N control cycles.

Even if an impulse noise is superimposed on the input wiring of the overvoltage detection circuit 13z and the counter circuit CNT1 receives the erroneous signal, the counter circuit CNT1 resets the count when the signal returns to be normal.

Since the second determination circuit 13A has the sampling circuit 13y at a stage subsequent to the overvoltage detection circuit 13z, the phase short-circuit command ZVC is output Led with delay after it is detected that the smoothing capacitor voltage Vfc exceeds the second set voltage Vfcz. The determination period Tzvc required for the second determination circuit 13A to output the phase short-circuit command ZVC is set on the basis of a time period obtained by adding a time period of N control cycles and a time period required for the overvoltage detection circuit 13z to detect overvoltage, and considering other delays therefor.

As described above, the second determination circuit 13A has the sampling circuit 13y at a stage subsequent to the overvoltage detection circuit 13z, to generate the phase short-circuit command ZVC, and thus can prevent erroneous determination due to noise.

Instead of the sampling circuit 13y configured by the counter circuit CNT1, for example, a filter circuit such as a low-pass filter may be used as a determination delay circuit. Also in this case, erroneous determination due to noise cart be prevented in the same manner.

As described above, in the present embodiment 4, the electric motor drive device 110 includes: the overvoltage protection unit 60 having the discharge circuit 10 in which the discharge resistor 7, the fuse 8, and the IGBT 9 are connected in series; and the phase short-circuit control unit 12. The phase short-circuit control unit 12 is provided in the control device 5, and the overvoltage protection unit 60 is configured independently of the phase short-circuit control unit 12. The second set voltage Vfcz used for determination by the second determination circuit 13A in the phase short-circuit control unit 12 is equal to or smaller than the first set voltage Vfcm used for determination by the first determination circuit 11 in the overvoltage protection unit 60. The determination period Tzvc required for the phase short-circuit control unit 12 to perform voltage determination is longer than the determination delay Tov of the first determination circuit 11, and is shorter than the melting time constant Tmel of the fuse 8 at the value of current (maximum discharge current) that flows through the discharge circuit 10 when the regenerative power from the electric motor 2 is maximum.

In the electric motor drive device 110 configured as described above, first, regenerative power occurring in the case of abnormality is consumed in the discharge resistor 7 of the overvoltage protection unit 60 so that the smoothing capacitor voltage Vfc is suppressed, and thereafter, when the determination period Tzvc of the second determination circuit 13A has elapsed, flow of the regenerative power into the smoothing. Capacitor 4 is stopped by phase short-circuit control of the inverter 1 by the phase short-circuit control unit 12.

Since the second set voltage Vfcz is equal to or smaller than the first set voltage Vfcm, the smoothing capacitor voltage Vfc can be prevented from becoming equal to or smaller than the Second set voltage Vfcz through overdischarge operation of the overvoltage protection unit 60 in the case where the regenerative power is smaller than the maximum regenerative power Pmax. Thus, the phase short-circuit control of the inverter 1 by the phase short-circuit control unit 12 can be reliably operated.

By the phase short-circuit Control of the inverter 1, the regenerative power flows back in the electric motor 2. Therefore, the period of flow of the regenerative power into the smoothing capacitor 4 and the period of processing for the regenerative power by the overvoltage protection unit 60 are up to the time of starting the phase short-circuit control of the inverter 1.

Therefore, the smoothing capacitor 4 can be downsized, and the period for processing the regenerative power by the overvoltage protection unit 60 can be shortened, whereby load on the overvoltage protection unit 60 can be reduced. In the overvoltage protection unit 60, as compared to the case of processing regenerative power by only the overvoltage protection unit 60, load on the discharge circuit 10 can be reduced and as a result, small-size components can be used. Further, voltage increase in the smoothing capacitor 4 can be reliably suppressed.

In actual designing, the first set voltage Vfcm (or voltage Vfcl) is designed by adding a margin to the second set voltage Vfcz in consideration of voltage undershoot due to circuit operation delay or the like.

The determination period Tzvc of the phase short-circuit control unit 12 is set to be longer than the determination delay Tov of the first determination circuit 11, and the phase short-circuit control unit 12 outputs the phase short-circuit command ZVC when having detected overvoltage over plural times of control cycles. Thus, it is possible to prevent erroneous operation of the phase short-circuit control unit 12 due to noise superimposed on a signal input part of the computing processing unit in the control device 5.

In addition, since the overvoltage protection unit 60 is configured independently of the phase short-circuit control unit 12, mounting can be made so as to prevent noise from entering the first determination circuit 11 in the overvoltage protection unit 60, whereby erroneous operation of the overvoltage protection unit 60 can be prevented. As an example, the control device 5 is mounted on a control printed board separated from the main circuit, and as for the overvoltage protection Unit 60, the first determination circuit 11 formed from a simple analog determination circuit is mounted just near a voltage measurement point for the smoothing capacitor 4.

In the case of abnormality in which great discharge current Icr flows beyond the determination period Tzvc of the phase short-circuit control unit 12, the fuse is melted to prevent heating, ignition, or the like of the discharge resistor 7. Thus, reliability of the overvoltage protection unit 60 can be Improved.

The determination period Tzvc is smaller than the melting time constant Tmel of the fuse 8 at the maximum discharge current. Therefore, in the case of normal load dump, the discharge current Icr due to the regenerative power does not flow through the fuse 8 beyond the determination period Tzvc and the fuse 8 is not melted. In addition, since abnormality such as load dump occurs with low frequency, it is not necessary to consider deterioration in the fuse 8, and reliable circuit protection can be achieved.

The fuse 8 is easily applicable because the conduction period of the fuse 8 is a limited period and therefore designing of the fuse 8 is easy and because the frequency of conduction of the fuse 8 is low and a deterioration problem does not arise.

Using the fuse 8 for the discharge circuit 10 facilitates construction of a redundant system (described later) based on assumption of failure of the discharge circuit 10.

Further, in the present embodiment 4, the determination period Tzvc of the second determination circuit 13A is set such that the maximum regenerative power Pmax occurring in the electric motor 2 does not exceed the permissible power P(Tzvc) of the discharge resistor 7 with respect to a time width equivalent to the determination period Tzvc, and thus the discharge resistor 7 is prevented from being overloaded. In addition, it is possible to set an appropriate determination period Tzvc in accordance with characteristics of the discharge resistor 7, and the components of the discharge resistor 7 can be downsized.

The determination period Tzvc is set on the basis of characteristics of the permissible power with respect to a pulse width in the discharge resistor 7. Such setting is enabled because the period for processing the regenerative power by the overvoltage protection unit 60 can be shortened and because abnormality such as load dump occurs with low frequency and therefore deterioration in the discharge resistor 7 need not be considered.

Embodiment 5

Figure 17:
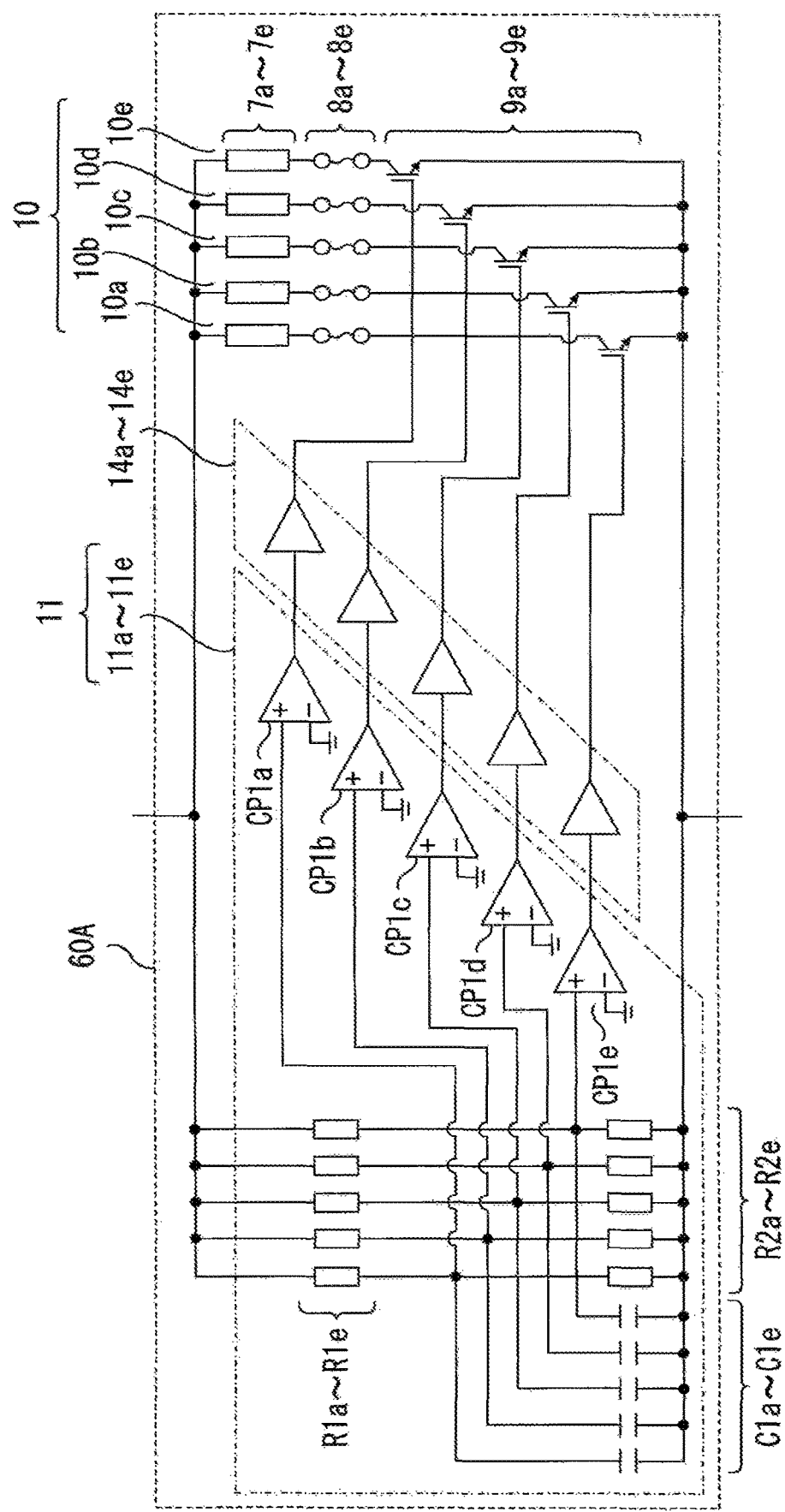
FIG. 17 is a diagram showing the configuration of an overvoltage protection unit according to embodiment 5 of the present invention.

Next, embodiment 5 of the present invention will be described. FIG. 17 is a diagram showing the configuration of an overvoltage protection unit 60A of an electric motor drive device 110 according to embodiment 5 of the present invention. The configurations other than the overvoltage protection unit 60A are the same as in the above embodiment 4.

In the present embodiment, the discharge circuit 10 and the first determination circuit 11 in the overvoltage protection, unit 60A are each configured by connecting, in parallel, a plurality of circuits the number of which is N (in this case, 5). As shown in FIG. 17, the discharge circuit 10 is configured by connecting, in parallel, series circuits 10a to 10e in which discharge resistors 7a to 7e, fuses 8a to 8e, and IGBTs 9a to 9e are respectively connected in series. The first determination circuit 11 is configured by connecting, in parallel, determination circuits 11a to 11e respectively having: resistors R1a to R1e and R2a to R2e for dividing the smoothing capacitor voltage Vfc; capacitors C1a to C1e forming low-pass filter circuits; and comparators CP1a to CP1e. In addition, gate drive circuits 14a to 14e are provided on the output side of the first determination circuits 11 (11a to 11e).

Each, series circuit 10a to 10e in the discharge circuit 10 is connected between both terminals of the smoothing capacitor 4, and the conduction states of the IGBTs 9a to 9e in the series circuits 10a to 10e are controlled on the basis of output signals from the determination circuits 11a to 11e in the first determination circuit 11.

Each determination circuit 11a to 11e Is the same as that shown in FIG. 15 in the above embodiment 4. In the case of abnormality such as load dump, if the smoothing capacitor voltage Vfc exceeds the first set voltage Vfcm, the IGBTs 9a to 9e are turned on so that currents flow through the series circuits 10a to 10e. Thus, regenerative power from the electric motor 2 is absorbed by the discharge resistors 7a to 7e, and overvoltage in the main circuit of the electric motor drive device 110 is prevented.

In the case of abnormality in which a load dump occurs during regenerative operation of the electric motor 2, protection operation for protecting the main circuit of the electric motor drive device 110 from overvoltage is basically the same as that shown in FIG. 12. In the above embodiment 4. That is, first, regenerative power occurring in the case of abnormality is consumed in the discharge circuit 10 of the overvoltage protection unit 60A so that the smoothing capacitor voltage Vfc is suppressed, and thereafter, when the determination period Tzvc of the second, determination circuit 13A has elapsed, flow of the regenerative power into the smoothing capacitor 4 is stopped by phase short-circuit control of the inverter 1 by the phase short-circuit control unit 12.

Regarding the fuses 8a to 8e of the series circuits 10a to 10e in the discharge circuit 10, as in the above embodiment 4, the melting time constant Tmel at the maximum discharge current √(Pmax/Rc) defined by the resistance value Rc of the discharge resistors 7a to 7e and the maximum regenerative power Pmax is greater than the determination period Tzvc of the second determination circuit 13A.

In the present embodiment, the permissible power P(Tzvc) of each discharge resistor 7a to 7e with respect to a time width equivalent to the determination period Tzvc of the second determination circuit 13A is smaller than the maximum regenerative power Pmax occurring in the electric motor 2. A permissible power sum ΣP(Tzvc) of the discharge resistors 7a to 7e in m (in this case, 4) series, circuits 10a to 10e of the N series circuits 10a to 10e is equal to or greater than the maximum regenerative power Pmax.

In this case, each one of the discharge resistors 7a to 7e does not have a withstand property that allows discharge of the maximum regenerative power Pmax. On the other hand, the components of the discharge resistors 7a to 7e are selected such that the permissible power sum Σ(Tzvc) of any four of the discharge resistors is equal to or greater than the maximum regenerative power Pmax.

Thus, an overvoltage protection function can be achieved as long as m or more of the N series circuits 10a to 10e connected in parallel and composing the discharge circuit 10 are normal. That, is, an m/N redundant system that can achieve the function with operations of m circuits among the N circuits is used.

As described above, the melting time constant Tmel of the fuse 8 (8a to 8e) at the maximum discharge current $\sqrt{(Pmax/Rc)}$ is set to be longer than the determination period Tzvc of the second determination circuit 13A. The discharge current Icr due to the regenerative power does not flow through each fuse 8a to 8e beyond the determination period Tzvc, and therefore the fuses 8a to 8e are not melted in the case of load dump.

On the other hand, in the case of abnormality in which, for example, the IGBT 9a to 9e is erroneously turned on or undergoes short-circuit failure due to noise of the comparator CP1a to CP1e fails, and thus the discharge current Icr continues to flow through each series circuit 10a to 10e in the discharge circuit 10 beyond the determination period Tzvc, the fuse 8a to 8e of the corresponding series circuit 10a to 10e is melted, whereby heating, ignition, or the like of each discharge resistor 7a to 7e can be prevented.

For example, if the discharge current Icr flows through the series circuit 10a in the discharge circuit 10 beyond the determination period Tzvc, the fuse 8a of the series circuit 10a is melted. At this time, the other four series circuits 10b to 10e operate normally, and the permissible power sum ΣP(Tzvc) of the four discharge resistors 7b to 7e is equal to or greater than the maximum regenerative power Pmax. Therefore, the overvoltage protection function can be continuously achieved thereafter.

In the present embodiment, since multiple discharge resistors 7 (7a to 7e) are connected in parallel in the discharge circuit 10, it becomes possible to deal with great regenerative power, and thus application to a system with great regenerative power is allowed. It is considered that the size of the discharge resistors 7 is dominant in the overvoltage protection unit 60A. In the case where necessary power is ensured by the permissible power sum of the four discharge resistors 7a to 7e, if a similar redundant circuit is simply provided, eight discharge resistors are needed and the circuit magnitude is doubled. In the present embodiment, since the 4/5 redundant system is used, a simple redundant system is achieved while increase in the circuit magnitude is suppressed.

The configurations other than redundancy of the overvoltage protection unit 60A are the same as in the above embodiment 4, and the same effects as in the above embodiment 4 are obtained.

In general, the m/N redundant system suppresses increase in the circuit magnitude, while reducing the reliability improving effect which is an advantage of redundancy. However, the m/N redundant system is effective in the case where the actual operation period is sufficiently shorter than the average failure period.

The failure rate for one circuit of the series circuits 10a to 10e is denoted by a constant λ0, and the failure rates of the other components such as the comparators CP1a to CP1e are sufficiently small and can be ignored. In this case, a reliability function R(t) of the overvoltage protection unit 60A (4/5 redundant system) shown in FIG. 17 is a sum of a value in the case where the five parallel circuits are all normal and a value in the case where four of the parallel circuits are normal and one of them has failed, and is represented by the following expression (3).

$$R(t) = T^5 + ({}_5C_4) \cdot T^4 \cdot (1-T) \quad (3)$$

Here, T is exp (−λ0·t).

In addition, C represents combination.

Therefore, a failure rate λ(t) of the 4/5 redundant system is represented by the following expression (4).

$$\lambda(t) = (dR(t)/dt)/R(t) \quad (4)$$
$$= 20(\lambda 0) \cdot (1-T)/(5-4T)$$

Here, λ(t) is a function of time even though λ0 is a constant. Normally, the actual operation period is sufficiently shorter than the average failure period, and λ0·t≪1 is satisfied. Therefore, the failure rate λ(t) can be approximated as shown by the following expression (5).

$$\lambda(t) \approx 20(\lambda 0) \cdot (\lambda 0 \cdot t) \quad (5)$$

In the above expression (5), the coefficient 20 means increase in the failure rate due to increase in the number of circuits connected in parallel. The coefficient (λ0·t) means that, if an actual operation period t is shorter than the average failure period, the probability that multiple circuits fail at the same time decreases and therefore the failure rate decreases. For example, in the case of the actual operation period t in which the value, of (λ0·t) is 1/200 or smaller, the failure rate λ(t) of the 4/5 redundant system can be decreased to be equal to or smaller than 1/10 of the failure rate λ0 for one circuit.

In this way, in the present embodiment, reliability improvement by redundancy can be achieved while size increase of the circuit is suppressed.

In this case, since, the value m of the m/N redundant system is set to N−1, the effect of suppressing increase in the circuit size is great.

In the present embodiment, regarding each of the discharge resistors 7a to 7e, the fuses 8a to 8e, and the IGBTs 9a to 9e, a circuit configuration having one element is employed. However, the circuit of each of the discharge resistors 7a to 7e, the fuses 8a to 8e, and the IGBTs 9a to 9e may be configured by multiple, elements connected in parallel.

Embodiment 6

Figure 18:
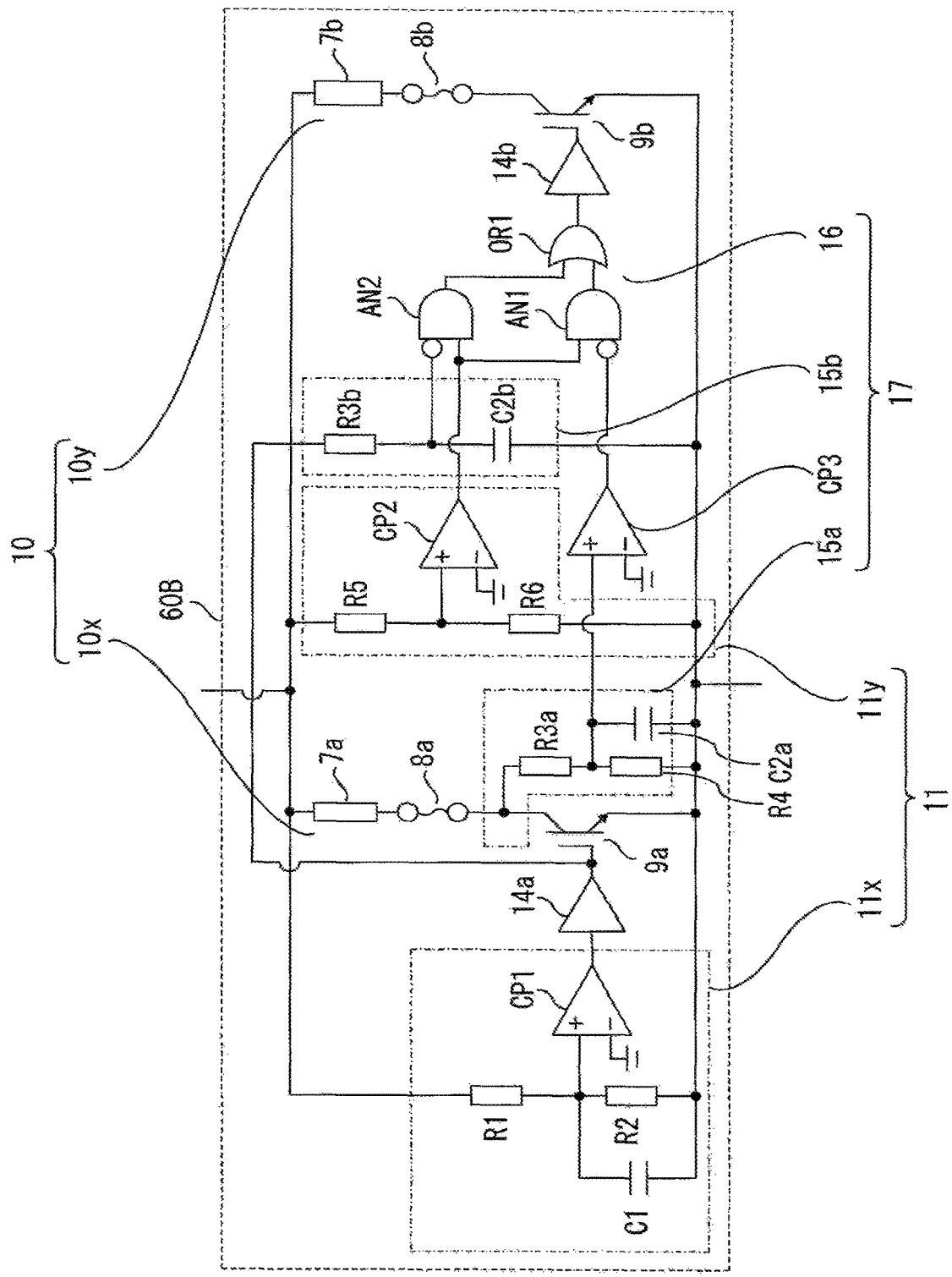
FIG. 18 is a diagram showing the configuration of ah overvoltage protection unit according to embodiment 6 of the present invention.

Next, embodiment 6 of the present invention will be described. FIG. 18 is a diagram showing the configuration of an overvoltage protection unit 60B of an electric motor drive device 110 according to embodiment 6 of the present invention. The configurations other than the overvoltage protection unit 60B are the same as in the above embodiment 4.

As shown in FIG. 18, the overvoltage protection unit 60B includes: a discharge circuit 10 having a main series circuit 10x and a sub-series circuit 10y; a first determination circuit 11 for performing determination as to the smoothing capacitor voltage Vfc and operating the discharge circuit 10A; and a failure detection circuit 17 for detecting failure of the main series circuit 10x. When the main series circuit 10x has failed, the sub-series circuit 10y operates by the IGBT 9b being turned on. That is, the overvoltage protection unit 60B has a circuit configuration of a standby redundant system.

The main series circuit 10x and the sub-series circuit 10y are respectively configured by connecting the discharge resistors 7a, 7b, the fuses 8a, 8b, and the IGBTs 9a, 9b in series, and are connected between both terminals of the smoothing capacitor 4.

The first determination circuit 11 includes a main determination circuit 11x for controlling the IGBT 9a in the main series circuit 10x, and a sub-determination circuit 11y for controlling the IGBT 9b in the sub-series circuit 10y. The main determination circuit 11x includes resistors R1, R2 for dividing the smoothing capacitor voltage Vfc, a capacitor C1, and a comparator CP1. In addition, a gate, drive, circuit 14a is provided on the output side of the main determination circuit 11x.

The main series circuit 10x, the main determination circuit 11x, and the gate drive circuit 14a respectively have the same configurations as the discharge circuit 10, the first determination circuit 11, and the gate drive circuit 14 in the above embodiment 4, and operate in the same manner. That is, in the case of abnormality such as load dump, if the smoothing capacitor voltage Vfc exceeds the first set voltage Vfcm, the main determination circuit 11x turns on the IGBT 9a so that the main series circuit 10x conducts current, and regenerative power from the electric motor 2 is absorbed by the discharge resistor 7a, whereby overvoltage in the main circuit of the electric motor drive device 110 is prevented.

The sub-determination circuit 11y includes resistors R5, R6 for dividing the smoothing capacitor voltage Vfc, and a comparator CP2. In the sub-determination circuit 11y, the smoothing capacitor voltage Vfc is divided by the resistor R5 and the resistor R6, and the comparator CP2 performs determination as to the divided voltage. In the case of abnormality such as load dump, if the smoothing capacitor voltage Vfc exceeds the first set voltage Vfcm, the sub-determination circuit 11y outputs, from the comparator CP2, a Hi signal for turning on the IGBT 9b.

The failure detection circuit 17 includes: a comparator CP3 as a first voltage determination circuit for performing determination as to voltage at any of connection points in the main series circuit 10x, here, a connection point between the fuse 8a and the IGBT 9a; and a first mask circuit 15a provided on the input side of the comparator CP3. The failure detection circuit 17 further includes: a logic circuit 16 including an AND circuit AN2 operating as a second voltage determination circuit for performing determination as to voltage of the gate terminal of the IGBT 9a; and a second mask circuit 15b provided on the input side of the AND circuit AN2.

The first mask circuit 15a forms a low-pass filter by a CR filter that includes a capacitor C2a and resistors R3a, R4 for dividing the voltage at the connection point in the main series circuit 10x. The second mask circuit 15b forms a low-pass filter by a CR filter which, by a resistor R3b and a capacitor C2b, divides, voltage of the gate terminal of the IGBT 9a and outputs a signal. The first and second mask circuits 15a, 15b are circuits for masking signals having time widths equal to or shorter than the determination period Tzvc of the second determination circuit 13A. Here, CR filters are shown as an example, but the present invention is hot limited thereto.

The logic circuit 16 includes, in addition to the AND circuit AN2, an AND circuit AN1 and an OR circuit OR1, and outputs a signal for controlling the IGBT 9b. A gate drive circuit 14b is provided on the output side of the logic circuit 16. Output of the sub-determination circuit 11y is inputted to the AND circuit AN1 and the AND circuit AN2. An output inverted signal from the comparator CP3 is also inputted to the AND Circuit AN1, and an output inverted signal from the second mask circuit 15b is also inputted to the AND Circuit AN2. The OR circuit OR1 performs logical disjunction on outputs of the AND circuit AN1 and the AND circuit AN2, and outputs a signal to the IGBT 9b via the gate drive circuit 14b.

The main determination circuit 11x performs determination as to operation requirements of the main series circuit 10x, and the sub-determination circuit 11y performs determination as to operation requirements of the sub-series circuit 10y. In the present embodiment, assuming also failure of the comparators, the main determination circuit 11x and the sub-determination circuit 11y are respectively provided with the comparators CP1, CP2. However, one comparator may be shared.

The comparator CP3 in the failure detection circuit 17 performs determination as to failure of the main series circuit 10x, i.e., melting of the fuse 8a.

Hereinafter, operation of the overvoltage protection unit 60B will be described.

It is noted that operations of the main series circuit 10x and the main determination circuit 11x when a load dump has occurred are the same as those of the discharge circuit 10 and the first, determination circuit 11 in the above embodiment 4, and therefore the description thereof is omitted.

Failure examples that often occur in the main series circuit 10x are short-circuit failure of the IGBT 9a and erroneous operation of the gate drive circuit 14a due to noise or the like. In such a case, current conduction through the fuse 8a continues beyond the determination period Tzvc of the second determination circuit 13A, and further continues beyond the melting time constant Tmel of the fuse 8a, whereby the fuse 8a is melted. Thus, heating and ignition of the discharge resistor 7a in the main series circuit 10x are prevented. Owing to the melting of the fuse 8a, voltage on the collector side of the IGBT 9a reduces over a period longer than the determination period Tzvc, so that a signal is inputted to the comparator CP3 through the first mask circuit 15a and a Hi signal is inputted to the AND circuit AN1. In this way, melting of the fuse 8a can be detected.

In a situation in which the fuse 8a has been melted, if a load dump occurs, the comparator GP2 of the sub-determination circuit 11y determines that the smoothing capacitor voltage Vfc exceeds the first set voltage Vfcm, and a Hi signal is inputted to the AND circuit AN1 and the AND circuit AN2. As a result, the AND circuit AN1 outputs a Hi signal.

Even in the case where the fuse 8a has not been melted, if the gate drive circuit 14a has continued outputting a Lo signal over a period longer than the determination period Tzvc, a Hi signal is inputted to the AND circuit AN2 through the second mask circuit 15b. In this way, it is possible to detect failure of the comparator CP1 in the main determination circuit 11x or the gate drive circuit 14a, or gate short-circuit failure of the IGBT 9a. Also in this situation, if a load dump occurs, a Hi signal is inputted to the AND circuit AN1 and the AND circuit AN2 in accordance with the determination by the comparator CP2 of the sub-determination circuit 11y. As a result, the AND circuit AN2 outputs a Hi signal.

Then, outputs of the AND circuit AN1 and the AND circuit AN2 are subjected to logical disjunction, whereby, when the main series circuit 10x has failed without operating normally, the IGBT 9b is turned on to operate the sub-series circuit 10y.

As described above, in the present embodiment, the discharge circuit 10 includes the main series circuit 10x and the sub-series circuit 10y, and if the failure detection circuit 17 detects that the main series circuit 10x has failed and the first determination circuit 11 determines that the smoothing capacitor voltage Vfc exceeds the first set voltage Vfcm, the IGBT 9b in the sub-series circuit 10y is turned on.

Main failure examples of the discharge circuit 10 are that the discharge resistor 7a, 7b deteriorates beyond designing because of discharge operation, and that the IGBT 9a, 9b is broken at the time of switching. Since the sub-series circuit 10y operates only when the main series circuit 10x has failed, the failure rate of the sub-series circuit 10y is sufficiently smaller than the failure rate of the main series circuit 10x. Therefore, by the overvoltage protection unit 60B being configured as a standby redundant system, the failure rate of the overvoltage protection unit 60B can be greatly reduced and reliability can be improved.

Although the main series circuit 10x and the sub-series circuit 10y are arranged in parallel, since the standby redundant system is used, the maximum discharge capability does not increase. Therefore, in the case where regenerative power from the electric motor 2 is small, the discharge capability is prevented from being excessive, that is, the IGBTs 9a, 9b in the discharge circuit 10 are prevented from being repeatedly turned on/off frequently. Thus, noise due to frequent switching and heating of the IGBTs 9a, 9b can be reduced.

The configurations other than redundancy of the overvoltage protection unit 60B are the same as in the above embodiment 4, and the same effects as in the above embodiment 4 are obtained.

In the present embodiment, the AND circuit AN2 and the second mask circuit 15b are provided in the failure detection circuit 17, to perform determination as to voltage of the gate terminal of the IGBT 9a. However, the AND circuit AN2 and the second mask circuit 15b may be removed, and it is possible to detect failure due to melting of the fuse 8a.

In the present embodiment, regarding each of the discharge resistors 7a, 7b, the fuses 8a, 8b, and the IGBTs 9a, 9b, a circuit configuration having one element is employed. However, the circuit of each of the discharge resistors 7a, 7b, the fuses 8a, 8b, and the IGBTs 9a, 9b may be configured by multiple elements connected in parallel.

In the above embodiment, one main series circuit 10x and one sub-series circuit 10y are provided as the discharge circuit 10. However, a plurality of sub-series circuits for which a usage order is set may be provided. For example, first and second sub-series circuits may be provided so that, if the main series circuit 10x has failed, the first sub-series circuit operates, and further, if the first sub-series circuit has failed, the second sub-series circuit operates. Thus, the overvoltage protection unit can be configured as a multi-stage, standby redundant system, and reliability, is further improved.

Embodiment 7

Figure 19:
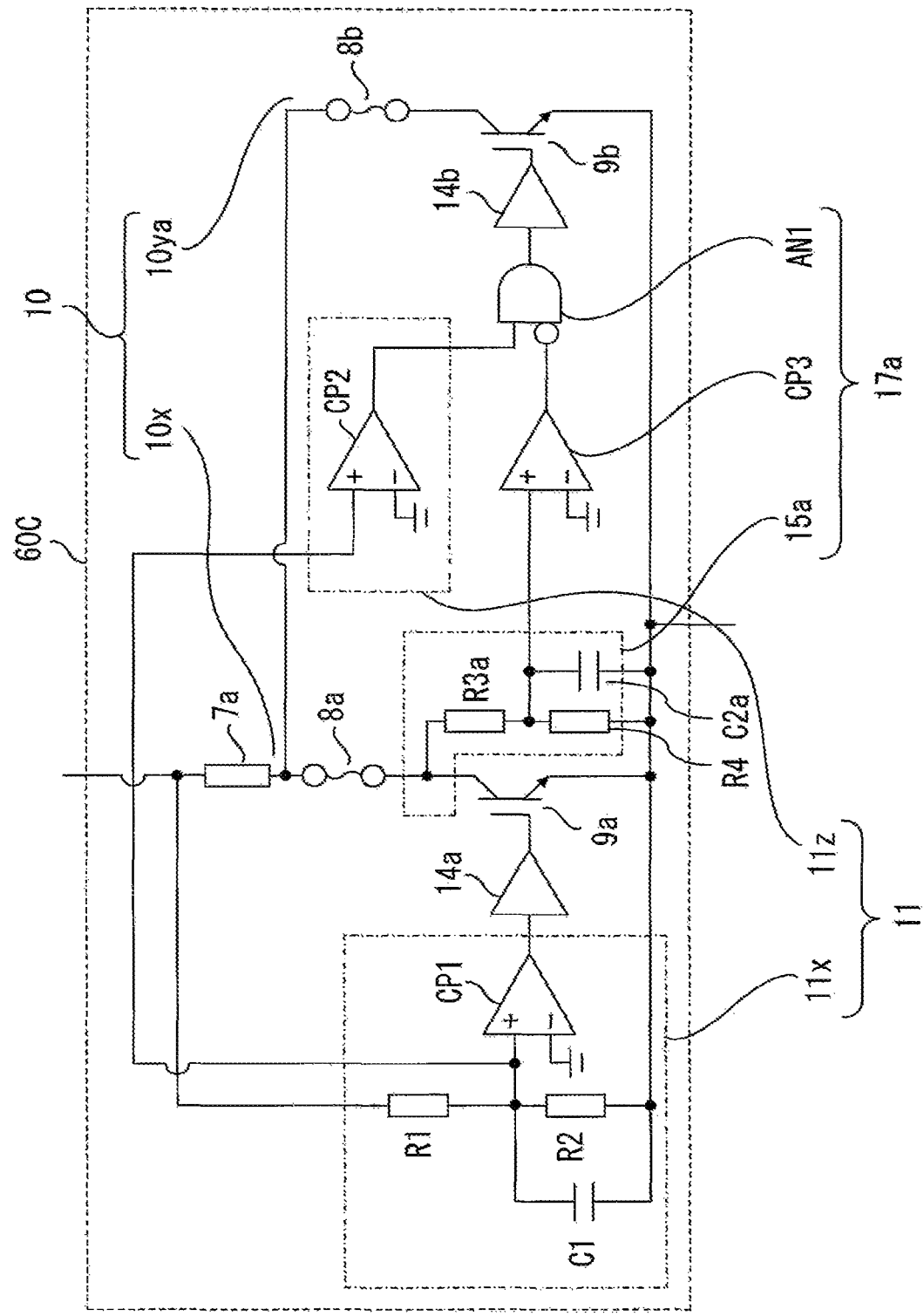
FIG. 19 is a diagram showing the configuration of an overvoltage protection unit according to embodiment 7 of the present invention.

Next, embodiment 7 of the present invention will be described. FIG. 19 is a diagram showing the configuration of an overvoltage protection unit 60C of an electric motor drive device 110 according to embodiment 7 of the present invention. The configurations other than the overvoltage protection unit 60C are the same as in the above embodiment 4.

As shown in FIG. 19, the overvoltage protection unit 60C includes: a discharge circuit 10 having a main series circuit 10x and a sub-series circuit 10ya; a first determination circuit 11 for performing determination as to the smoothing capacitor voltage Vfc and operating the discharge circuit 10; and a failure detection circuit 17a for detecting failure of the main series circuit 10x. When the main series circuit 10x has failed, the sub-series circuit 10ya operates by the IGBT 9b being turned on. That is, the overvoltage protection unit 60C has a circuit configuration of a standby redundant system.

The main series circuit 10x is the same as that in the above embodiment 6, i.e., is configured by connecting the discharge resistor 7a, the fuse 8a, and the IGBT 9a in series, and is connected between both terminals of the smoothing capacitor 4. The sub-series circuit 10ya includes a circuit in which the fuse 8a and the IGBT 9a are connected in series and which is connected in parallel to the circuit composed of the fuse 8a and the IGBT 9a of the main series circuit 10x. That is, in the sub-series circuit 10ya, the discharge resistor 7a of the main series circuit 10x is shared as a common discharge resistor, and the discharge resistor 7a, the fuse 8b, and the IGBT 9b are connected in series and are connected between both terminals of the smoothing capacitor 4.

The first determination circuit 11 includes a main determination circuit 11x for controlling the IGBT 9a in the main series circuit 10x, and a sub-determination circuit 11z for controlling the IGBT 9b in the sub-series circuit 10ya. The main determination circuit 11x includes resistors R1, R2 for dividing the smoothing capacitor voltage Vfc, a capacitor C1, and a comparator CP1. In addition, a gate drive circuit 14a is provided on the output side of the main determination circuit 11x.

It is noted that the main series circuit 10x, the main, determination circuit 11x, and the gate drive circuit 14a have, the same configurations as those in the above embodiment 6, and operate in the same manner.

The sub-determination circuit 11z is composed of a comparator CP2, and an input signal to the comparator CP1 of the main determination circuit 11x is also inputted to the comparator CP2, whereby determination as to the smoothing capacitor voltage Vfc is performed.

The failure detection circuit 17a includes: a comparator CP3 as a first voltage determination circuit for performing determination as to voltage at any of connection points. In the main series circuit 10x, here, a connection point between the fuse 8a and the IGBT 9a; a first mask circuit 15a provided on the input side of the comparator CP3; and an AND circuit AN1. It is noted that the comparator CP3, the first mask circuit 15a, and the AND circuit AN1 have the same configurations as those in the above embodiment 6, and operate in the same manner. In addition, a gate drive circuit 14b is provided on the output side of the AND circuit AN1.

The main determination circuit 11x performs determination as to operation requirements of the main series circuit 10x, and the sub-determination circuit 11z performs determination as to operation requirements of the sub-series circuit 10ya. In the present embodiment, assuming also failure of the comparators, the main determination circuit 11x and the sub-determination circuit 11z are respectively provided with the comparators CP1, CP2. However, one comparator may be shared. In this case, the sub-determination circuit 11z can be removed.

In the present embodiment, since the main series circuit 10x and the sub-series circuit 10ya share the discharge resistor 7a, only the fuses 8a, 8b and the IGBTs 9a, 9b are configured to be redundant, and it is possible to configure the overvoltage protection unit 60C as a standby redundant system, using a small-size discharge circuit 10.

In addition, since an input signal to the sub-determination circuit 11z is generated by utilizing the main determination circuit 11x, the sub-determination circuit 11z can also be simplified and thus the first determination circuit 11 can be simplified.

In this case, the failure detection circuit 17a does not perform determination as to voltage of the gate terminal of the IGBT 9a, and therefore does not have a function of detecting failure of the comparator CP1 of the main determination circuit 11x or the gate drive circuit 14a, or gate short-circuit failure of the IGBT 9a. That is, failure of the main series circuit 10x is detected with a small-sized and simplified circuit configuration.

Figure 20:
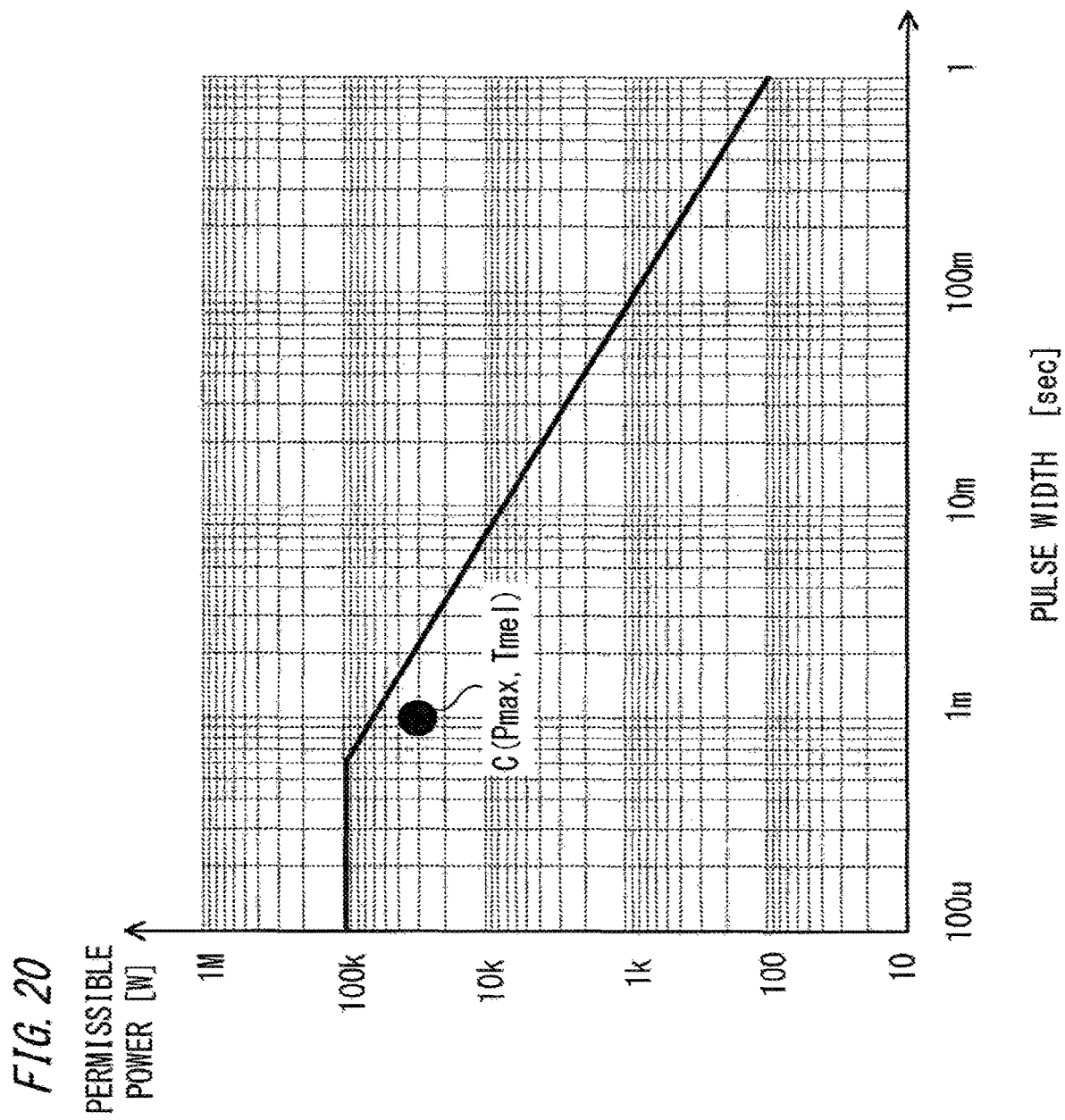
FIG. 20 shows characteristics of a discharge circuit according to embodiment 7 of the present invention.

In the present embodiment, as shown in FIG. 20, the discharge resistor 7a and the fuses. 8a, 8b are selected such that the maximum regenerative power Pmax from the electric motor 2 does not exceed permissible power of the discharge resistor 7a with respect to a time width equivalent to the melting time constant Tmel of the fuses 8a, 8b at the maximum discharge current $\sqrt{(Pmax/Rc)}$. In FIG. 20, a point C indicates that the maximum regenerative power Pmax is 30 kW and the melting time constant Tmel of the fuses 8a, 8b at the maximum discharge current $\sqrt{(Pmax/Rc)}$ is 1 ms. Thus, it is indicated that the permissible power of, the discharge resistor 7a with respect to a time width equivalent to the melting time constant Tmel=1 ms is equal to or greater than the maximum regenerative power Pmax.

Selecting the discharge resistor 7a and the fuses 8a, 8b as described above can prevent the discharge resistor 7a from failing due to overload. Therefore, the overvoltage protection unit 60C with a standby redundant system can be configured to be small-sized, and simplified, and in addition, the failure rate of the overvoltage protection unit 60C can be greatly reduced and reliability can be improved.

It is noted that the configurations other than redundancy of the overvoltage protection unit 60C are the same as in the above embodiment 4, and the same effects as in the above embodiment 4 are obtained.

In the present embodiment, regarding each of the discharge resistor 7a, the fuses 8a, 8b, and the IGBTs 9a, 9b, a circuit configuration having one element is employed. However, the circuit of each of the discharge resistor 7a, the fuses 8a, 8b, and the IGBTs 9a, 9b may be configured, by multiple elements connected in parallel.

Embodiment 8

Figure 21:
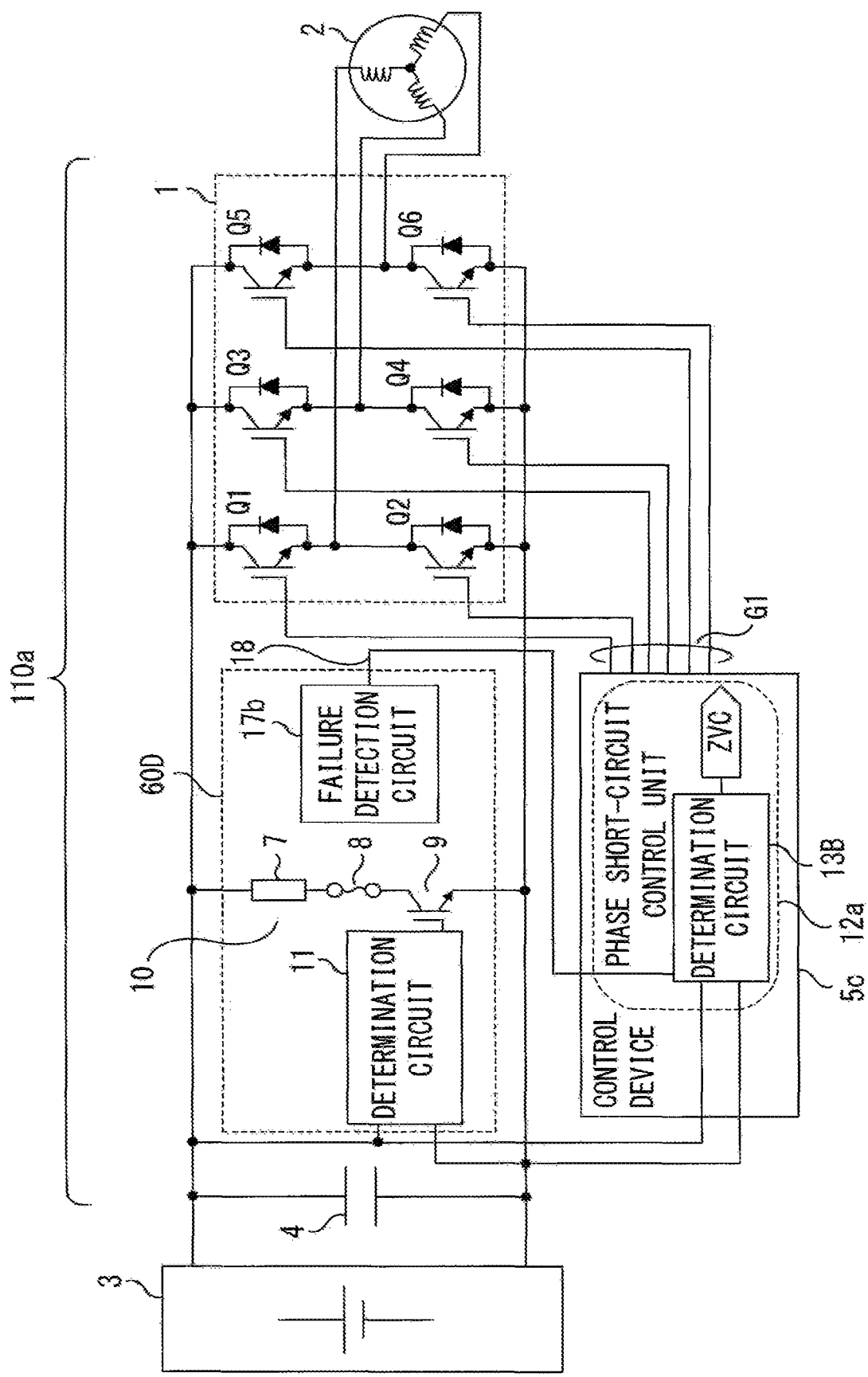
FIG. 21 is a diagram showing the schematic configuration of an electric motor drive device according to embodiment 8 of the present invention.

Next, embodiment 8 of the present invention will be described. FIG. 21 is a diagram showing the schematic configuration of an electric motor drive device 110a according to embodiment 8 of the present invention.

As shown in FIG. 21, the electric motor drive device 110a is configured to convert DC power from a DC power supply 3 to AC power by an inverter 1 and drive an electric motor 2, and includes: the inverter 1; a smoothing capacitor 4 connected in parallel to the DC power supply 3; a control device 5c for controlling, the inverter 1; and an overvoltage protection unit 60D.

The overvoltage protection unit 60D includes a discharge circuit 10, a first determination circuit 11, and a failure detection circuit 17b. The control device 5c includes a phase short-circuit control unit 12a having a second determination circuit 13B, and the second determination circuit 13B adjusts a preset determination period Tzvc so as to be shortened, on the basis of a failure detection signal 18 from the failure detection circuit 17b.

The configurations Other than the failure detection circuit 17b in the overvoltage protection unit 60D and the second determination circuit 13B in the phase short-circuit control unit 12a are the same as in the above embodiment 4.

Figure 22:
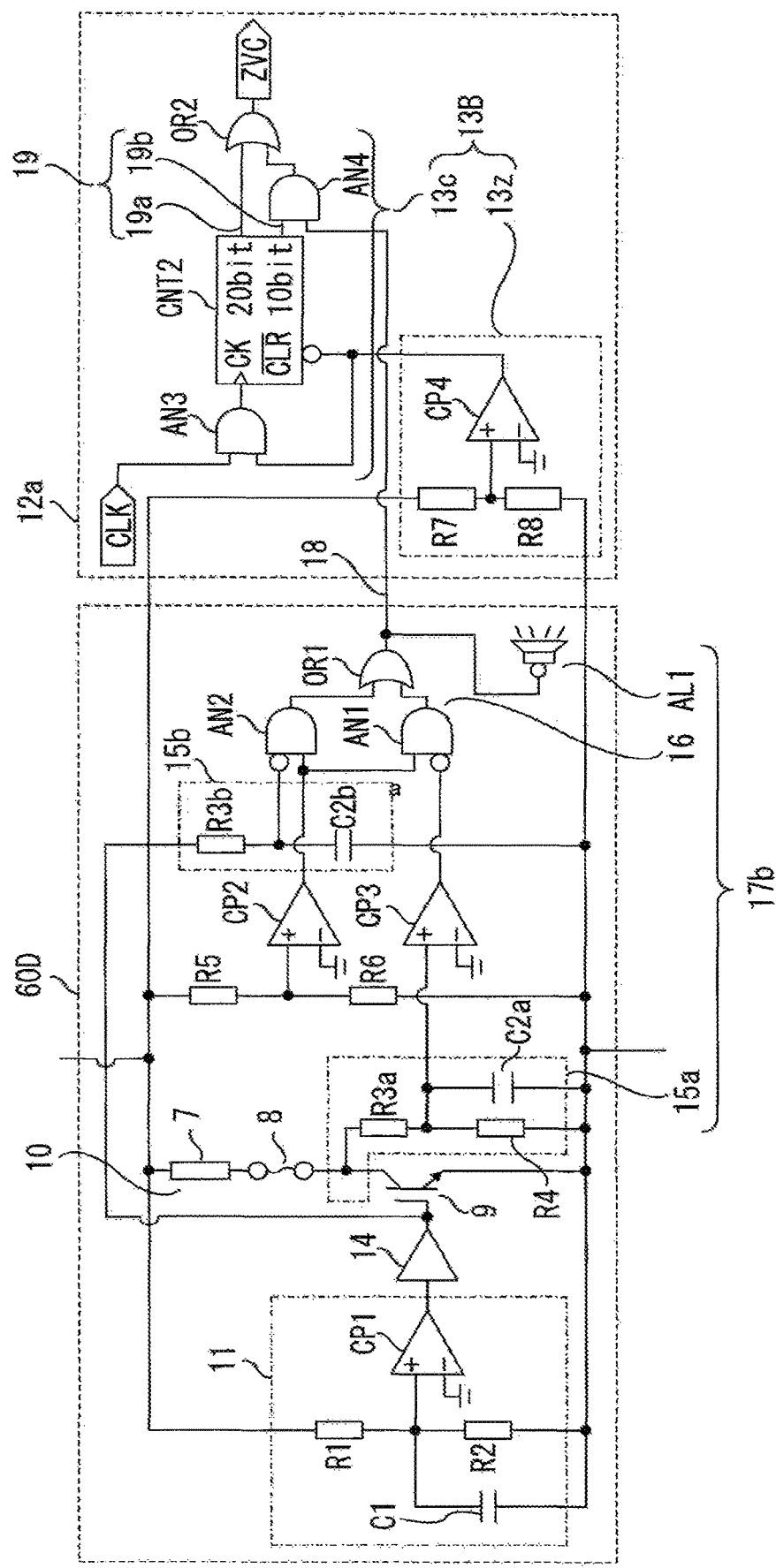
FIG. 22 is a diagram showing the configurations of an overvoltage protection unit and a phase short-circuit control unit according to embodiment 8 of the present invention.

FIG. 22 is a diagram showing the configurations of the overvoltage protection unit 60D and the phase short-circuit control unit 12a.

As shown in FIG. 22, the overvoltage protection unit 60D includes: the discharge circuit 10, the first determination circuit 11, and the gate drive circuit 14 which are the same as in the above embodiment 4; and the failure detection circuit 17b for detecting failure of the discharge circuit 10.

The failure detection circuit 17b includes: a comparator CP3 as a first voltage determination circuit for performing determination as to voltage at any of connection points in the discharge circuit 10, here, a connection point between the fuse 8 and the IGBT 9; a first mask circuit 15a provided on the input side of the comparator CP3; and an AND circuit AN1. In addition, the failure detection circuit 17b includes resistors R5, R6 for dividing the smoothing capacitor voltage Vfc, and a comparator CP2. The circuit composed of the resistors R5, R6 and the comparator CP2 has the same configuration as the sub-determination circuit 11y in the above embodiment 6, and operates in the same manner. The failure detection circuit 17b further includes: a logic circuit 16 including an AND circuit AN2 operating as a second voltage determination circuit for performing determination as to voltage of the gate terminal of the IGBT 9; a second mask circuit 15b provided on the input side of the AND circuit AN2; and an alarm device AL1.

The first and second mask circuits 15a, 15b are the same as those in the above embodiment 6, and mask signals having time widths equal to or shorter than the determination period Tzvc of the second determination circuit 13B. The logic circuit 16 is also the same as that in the above embodiment 6, and includes, in addition to the AND circuit AN2, the AND circuit AN1 and an OR circuit OR1. In this case, there is no gate drive circuit on the output side, and the OR circuit OR1 outputs a failure detection signal 18.

As described above, the failure detection circuit 17b is configured by incorporating the sub-determination circuit 11y and the alarm device AL1 into the failure detection circuit 17 in the above embodiment 6, and when failure of the discharge circuit 10 is detected and it is determined that the smoothing capacitor voltage Vfc exceeds the first set voltage Vfcm, the failure detection circuit 17b outputs the failure detection signal 18. The failure detection signal 18 causes the alarm device AL1 to operate and is inputted to the phase short-circuit control unit 12a.

The alarm device AL1 reports to a high-order system that the overvoltage protection unit 60D has failed. Examples of the alarm, device AL1 include a warning light, an alarm, and an alarm signal to be transmitted to a microcomputer or the like. For example, in the case of automobile, a warning light of a meter panel may be lit up to notify a driver of the abnormality, or without directly notifying a driver of the abnormality, a warning may be issued to the system and the system may store the failure information so that the failure information can be used at the time of maintenance.

It is noted that the alarm device AL1 is provided as necessary and may be omitted.

The phase short-circuit control unit 12a includes a second determination circuit 13B for determining that the smoothing capacitor voltage Vfc exceeds second set voltage Vfcz in the case of abnormality such as load dump. If the smoothing capacitor voltage Vfc exceeds the second set voltage Vfcz, the second determination Circuit 13B generates a phase short-circuit command ZVC.

The second determination circuit 13B includes the overvoltage detection circuit 13z which is the same as in the above embodiment 4, and a sampling circuit 13c as a determination delay circuit.

The sampling circuit 13c includes: a clock circuit for generating a Control cycle signal CLK in every control cycle of the control device 5c; an AND circuit AN3; a counter circuit CNT2; ah AND circuit AN4; and an OR circuit OR2. The counter circuit CNT2 samples output of the overvoltage detection circuit 13z in every control cycle, and when the counter circuit CNT2 has counted set plural times (N times) of events, the counter circuit CNT2 outputs a phase short-circuit control signal 19. That is, when having received a signal detecting overvoltage from the overvoltage detection circuit 13z, the counter circuit CNT2 starts counting, and when having consecutively received signals detecting overvoltage from the overvoltage detection circuit 13z over N control cycles, the counter circuit CNT2 outputs the phase short-circuit control signal 19.

In this case, the counter circuit CNT2 has two output terminals so as to output a phase short-circuit control signal 19a when having counted the control cycle signal CLK twenty times, i.e., having counted by 20 bits, and output a phase short-circuit control signal 19b when having counted the control cycle signal CLK ten times, i.e., having counted by 10 bits. The determination period Tzvc required for the second determination circuit 13B to output the phase short-circuit command ZVC is set on the basis of a time period obtained by adding a time period of twenty control cycles and a time period required for the overvoltage detection, circuit 13z to detect overvoltage, and considering other delays therefor.

As described above, in the overvoltage protection unit 60b, if the failure detection circuit 17b detects failure of the discharge circuit 10 and it is determined that the smoothing capacitor voltage Vfcm exceeds the first set voltage Vfcm, the failure detection signal 18 is outputted. Then, the failure detection signal 18 causes the alarm device AL1 to operate and is inputted to the phase short-circuit control unit 12a.

In the phase, short-circuit control unit 12a, the failure detection signal 18 is inputted to the AND circuit AN4 together with the phase short-circuit control signal 19b. Then, the OR circuit OR2 performs logical disjunction on the phase short-circuit control signal 19a and output of the AND circuit AN4, and outputs the phase short-circuit command ZVC.

In the case where the overvoltage protection unit 60D is normally operating, the failure detection signal 18 is not generated, and therefore, if the phase short-circuit control signal 19a generated with counting by 20 bits is outputted from the counter circuit CNT2, the phase short-circuit command ZVC is outputted from the sampling circuit 13c.

Here, the counter circuit CNT2, when having started counting, will generate and output the phase short-circuit control signal 19b generated with counting by 10 bits, earlier than the phase short-circuit control signal 19a generated with counting by 20 bits. Therefore, if the failure detection circuit 17b outputs the failure detection signal 18, the phase short-circuit command ZVC is outputted via the AND circuit AN4 and the OR circuit OR2 at the time when the counter circuit CNT2 outputs the phase short-circuit control signal 19b. Thus, the phase short-circuit command ZVC is outputted with a determination period shorter than the set determination period Tzvc, whereby the control shifts to the phase short-circuit control for the inverter 1.

In the present embodiment, as described above, the overvoltage protection unit 60D is provided with the failure detection circuit 17b, and if the failure detection circuit 17b detects failure of the discharge circuit 10, the determination period of the second determination circuit 13B is adjusted to be shortened. Therefore, even in the case where the discharge circuit 10 does not normally perform discharge operation, it is possible to shift to the phase short-circuit control for the inverter 1 before the smoothing capacitor voltage Vfc exceeds the main circuit withstand voltage of the electric motor drive device 110a. The adjustment of the determination period of the second determination circuit 13B may be determined in accordance with the capacitance of the smoothing capacitor 4. If the capacitance of the smoothing capacitor 4 is small, the 10-bit counts in the counter circuit CNT2 may be further shortened.

In this way, even in the case where failure occurs in the overvoltage protection unit 60D, an overvoltage protection function is provided through early shift to the phase short-circuit control for the inverter 1, thereby enabling the operation to be continued during a predetermined period without stopping the electric motor drive device 110a. That is, the overvoltage protection unit 60D itself is not made redundant but the overvoltage protection unit 60D and the phase short-circuit control unit 12a achieve redundancy of the overvoltage protection function. Thus, size increase in the overvoltage protection unit 60D is suppressed while redundancy of the overvoltage protection function can be achieved.

In this case, in the phase short-circuit control unit 12a, the determination period of the second determination circuit 13B is shortened only when failure occurs in the overvoltage protection unit 60D. Therefore, increase in the risk of erroneous operation of the second determination circuit 13B is limited.

It is noted that the configurations other than redundancy of the overvoltage protection function are the same as in the above embodiment 4, and the same effects as in the above embodiment 4 are obtained.

The overvoltage protection units 60A to 60C having a redundant system described in the above embodiment 5 to 7 may be applied to the present embodiment 8, and through cooperation with the phase short-circuit control unit 12a, increased redundancy is obtained and reliability is further improved.

In the above embodiment, the case where the determination period of the second determination circuit 13B is adjusted to be shortened so as to perform early shift to the phase short-circuit control for the inverter 1, has been shown. However, early shift to the phase short-circuit control for the inverter 1 may be performed by another method such as changing the determination level of the phase short-circuit control. The change in the determination level of the phase short-circuit control may be achieved by lowering the second set voltage Vfcz set for the second determination circuit 13B in the phase short-circuit control unit 12a.

Embodiment 9

Figure 23:
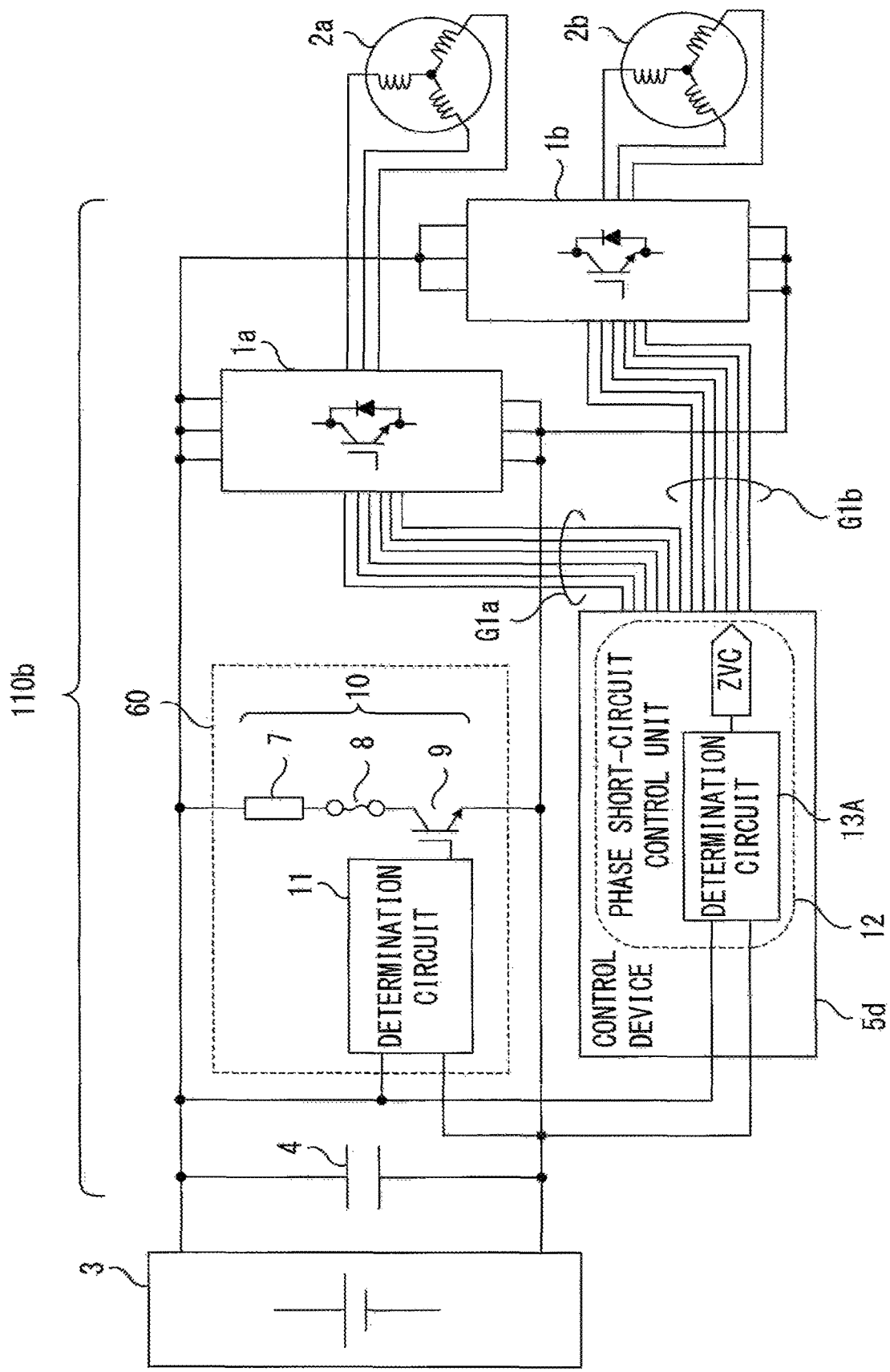
FIG. 23 is a diagram showing the schematic configuration of an electric motor drive device according to embodiment 9 of the present invention.

Next, embodiment 9 of the present invention will be described. FIG. 23 is a diagram showing the schematic, configuration of an electric motor drive device 110*b* according to embodiment 9 of the present invention.

As shown in FIG. 23, the electric motor drive device 110*b* is configured to drive two electric motors 2*a*, 2*b*, and includes two inverters 1*a*, 1*b* for driving the respective electric motors 2*a*, 2*b*. Further, the electric motor drive device 100*b* includes: a smoothing capacitor 4 connected in parallel to a DC power supply 3; a control device 5*d* for controlling the inverters 1*a*, 1*b*; and an overvoltage protection unit 60. It is noted that the electric motors 2*a*, 2*b* are each capable of both drive operation and regenerative operation.

The inverters 1*a*, 1*b* have the same configuration as the inverter 1 in the above embodiment 4, and the control device 5*d* generates gate signals G1*a*, G1*b* to control power-running operation and regenerative operation of the inverters 1*a*, 1*b*.

In this case, the maximum, regenerative power Pmax is the maximum value of the sum of regenerative powers of the two electric motors 2*a*, 2*b*. The phase short-circuit control by the phase short-circuit control unit 12 is applied to the two inverters 1*a*, 1*b*. The other configurations and operations are the same as in the above embodiment 4, and the same effects as in embodiment 4 can be obtained.

Such an electric motor drive device 110*b* is used for, as an example, a system including the electric motor 2*a* mainly for driving a load and the electric motor 2*b* mainly for electric generation, e.g., a system in a hybrid vehicle.

Also in the present embodiment, redundancy of the overvoltage protection function shown in each of the above embodiments 5 to 8 is applicable in the same manner, and thus the same effects as in each of the above embodiments 5 to 8 can be obtained.

It is noted that, within the scope of the present invention, the above embodiments may be freely combined with each other, or each of the above embodiments may be modified or simplified as appropriate.

The invention claimed is:

1. An electric motor drive device comprising:
a smoothing capacitor connected in parallel to a DC power supply;
an inverter which has a plurality of semiconductor switching elements and converts DC power from the smoothing capacitor to multi-phase AC power, to drive an electric motor;
a control device for drive-controlling the plurality of semiconductor switching elements with a predetermined control cycle, to control power-running operation and regenerative operation of the inverter; and
an overvoltage protection unit having a discharge circuit which has a discharge resistor and a semiconductor switching element connected in series and which is connected between both terminals of the smoothing capacitor; and a first determination circuit for determining that voltage of the smoothing capacitor exceeds first set voltage, the overvoltage protection unit being configured to turn on the semiconductor switching element in the discharge circuit on the basis of the determination by the first determination circuit, wherein
the control device includes a phase short-circuit control unit having a second determination circuit for determining that voltage of the smoothing capacitor exceeds second set voltage lower than the first set voltage, the phase short-circuit control unit being configured to bring the electric motor into a phase short-circuited state on the basis of the determination by the second determination circuit, and
a determination period required for the second determination circuit to perform the determination is longer than a period required for the first determination circuit to perform the determination.

2. The electric motor drive device according, to claim 1, wherein
the determination period is set such that maximum regenerative power generated in the electric motor does not exceed permissible power of the discharge resistor with respect to a time width equivalent to the determination period of the second determination circuit.

3. The electric motor drive device according to claim 1, wherein
the discharge circuit further has a fuse such that the discharge resistor, the semiconductor switching element, and the fuse are connected in series, and
the determination period of the second determination circuit is smaller than a melting time constant of the fuse at a value of current flowing through the discharge circuit when regenerative power from the electric motor is maximum.

4. The electric motor drive device according to claim 3, wherein
the discharge circuit in the overvoltage protection unit includes a main series circuit and a sub-series circuit each having the discharge resistor, the fuse, and the semiconductor switching element which are connected in series, and
the overvoltage protection unit includes a failure detection circuit for detecting failure of the main series circuit, and when the failure detection circuit detects failure of the main series circuit and the first determination circuit determines that voltage of the smoothing capacitor exceeds the first set voltage, the overvoltage protection unit turns on the semiconductor switching element in the sub-series circuit.

5. The electric motor drive device according to claim 4, wherein
the discharge circuit includes a plurality of the sub-series circuits.

6. The electric motor drive device according to claim 4, wherein
the discharge resistor of the main series circuit and the discharge resistor of the sub-series circuit are a common discharge resistor shared therebetween, and the fuse and the semiconductor switching element of the sub-series circuit are connected in parallel to the fuse and the semiconductor switching element of the main series circuit.

7. The electric motor drive device according to claim 6, wherein
maximum regenerative power generated in the electric motor does not exceed permissible power of the discharge resistor with respect to a time width equivalent to the melting time constant of the fuse.

8. The electric motor drive device according to claim 4, wherein
the failure detection circuit includes: a first voltage determination circuit for performing determination as to voltage at any of connection points among the discharge resistor, the fuse, and the semiconductor switching element in the discharge circuit; and a first mask circuit provided on an input side of the first voltage determination circuit, and the first mask circuit masks a signal having a time width equal to or shorter than the determination period of the second determination circuit.

9. The electric motor drive device according to claim 4, wherein
the failure detection circuit includes: a second voltage determination circuit for performing determination as to voltage of a control terminal of the semiconductor switching element in the discharge circuit; and a second mask circuit provided on an input side of the second voltage determination circuit, and
the second mask circuit masks a signal having a time width equal to or shorter than the determination period of the second determination circuit.

10. The electric motor drive device according to claim 3, wherein
the overvoltage protection unit includes a failure detection circuit for detecting failure of the discharge circuit, and
when the failure detection circuit detects failure of the discharge circuit, the phase short-circuit control unit adjusts the determination period of the second determination circuit so as to be shortened.

11. The electric motor drive device according to claim 10, wherein
when the failure detection circuit detects failure of the discharge circuit, the overvoltage protection unit outputs a warning.

12. The electric motor drive device according to claim 3, wherein
the overvoltage protection unit includes a failure detection circuit for detecting failure of the discharge circuit, and
when the failure detection circuit detects failure of the discharge circuit, the phase short-circuit control unit adjusts the second set voltage of the second determination circuit so as to be lowered.

13. The electric motor drive device according to claim 1, wherein
the first determination circuit in the overvoltage protection unit includes a hysteresis comparator, to determine that voltage of the smoothing capacitor exceeds the first set voltage.

14. The electric motor drive device according to claim 1, wherein
the first determination circuit in the overvoltage protection unit includes a transient voltage suppressor element, and determines that voltage of the smoothing capacitor exceeds the first set voltage, on the basis of voltage breakdown operation of the transient voltage suppressor element.

15. The electric motor drive device according to claim 1, wherein
the first determination circuit in the overvoltage protection unit includes an operational amplifier, to determine that voltage of the smoothing capacitor exceeds the first set voltage.

16. The electric motor drive device according to claim 1, wherein
the discharge circuit in the overvoltage protection unit includes N series circuits provided in parallel and each having the discharge resistor, the semiconductor switching element, and a fuse which are connected in series,
the determination period of the second determination circuit is smaller than a melting time constant of the fuse at a value of current flowing through each series circuit when regenerative power from the electric motor is maximum, and
permissible power of each discharge resistor with respect to a time width equivalent to the determination period of the second determination circuit is smaller than maximum regenerative power generated in the electric motor, and a sum of the permissible powers of the discharge resistors in m series circuits of the N series circuits is equal to or greater than the maximum regenerative power.

17. The electric motor drive device according to claim 16, wherein m=N−1 is satisfied.

18. The electric motor drive device according to claim 1, comprising a plurality of the inverters, wherein
the plurality of inverters respectively drive a plurality of the electric motors.

19. The electric motor drive device according to claim 1, wherein
the second determination circuit in the phase short-circuit control unit includes: a detection circuit for detecting that voltage of the smoothing capacitor exceeds the second set voltage; and a determination delay circuit which is composed of a counter circuit or a filter circuit and which outputs a determination signal on the basis of a signal that has been sent, over a plurality of the control cycles, from the detection circuit.

20. The electric motor drive device according to claim 1, wherein
in the case where connection between the DC power supply and the smoothing capacitor is opened, the overvoltage protection unit turns on the semiconductor switching element in the discharge circuit on the basis of the determination by the first determination circuit.

* * * * *